(12) United States Patent
Bullivant et al.

(10) Patent No.: US 10,755,465 B2
(45) Date of Patent: Aug. 25, 2020

(54) SYSTEM FOR NEUROBEHAVIORUAL ANIMATION

(71) Applicant: Soul Machines Limited, Auckland (NZ)

(72) Inventors: David Peter Bullivant, Auckland (NZ); Paul Burton Robertson, Auckland (NZ); Mark Andrew Sagar, Auckland (NZ)

(73) Assignee: Soul Machines Limited, Auckland (NZ)

( * ) Notice: Subject to any disclaimer, the term of this patent is extended or adjusted under 35 U.S.C. 154(b) by 0 days.

(21) Appl. No.: 16/204,645

(22) Filed: Nov. 29, 2018

(65) Prior Publication Data

US 2019/0172242 A1    Jun. 6, 2019

Related U.S. Application Data

(63) Continuation of application No. 14/909,570, filed as application No. PCT/NZ2014/000156 on Aug. 4, 2014, now Pat. No. 10,181,213.

(Continued)

(51) Int. Cl.
*G06T 13/40* (2011.01)
*G06N 3/00* (2006.01)

(52) U.S. Cl.
CPC ............. *G06T 13/40* (2013.01); *G06N 3/004* (2013.01); *G06T 2213/12* (2013.01)

(58) Field of Classification Search
None
See application file for complete search history.

(56) References Cited

U.S. PATENT DOCUMENTS

| | | | |
|---|---|---|---|
| 2004/0143559 A1* | 7/2004 | Ayala | G06N 3/086 706/13 |
| 2004/0250210 A1* | 12/2004 | Huang | G06T 13/40 715/706 |

(Continued)

FOREIGN PATENT DOCUMENTS

| | | | |
|---|---|---|---|
| JP | 2005-100390 A | 4/2005 | |
| JP | 2006-525570 A | 11/2006 | |

(Continued)

OTHER PUBLICATIONS

Translation of Chinese Office Action for CN Application No. 2016-531577 dated May 7, 2019 (5 pages).
International Search Report and Written Opinion for International Application No. PCT/NZ2014/000156 dated Dec. 12, 2014 (10 pages).
European Search Report for EP Application No. 14832511.1 dated Feb. 22, 2017, 7 pages.

(Continued)

*Primary Examiner* — Nurun N Flora
(74) *Attorney, Agent, or Firm* — Merchant & Gould P.C.

(57) ABSTRACT

The present invention relates to a computer implemented system for animating a virtual object or digital entity. It has particular relevance to animation using biologically based models, or behavioural models particularly neurobehavioural models. There is provided a plurality of modules having a computational element and a graphical element. The modules are arranged in a required structure and have at least one variable and being associated with at least one connector. The connectors link variables between modules across the structure, and the modules together provide a neurobehavioural model. There is also provided a method of controlling a digital entity in response to an external stimulus.

26 Claims, 14 Drawing Sheets

Related U.S. Application Data

(60) Provisional application No. 62/005,195, filed on May 30, 2014.

(56) References Cited

U.S. PATENT DOCUMENTS

| | | | |
|---|---|---|---|
| 2005/0118996 A1 | 6/2005 | Lee et al. | |
| 2006/0184355 A1* | 8/2006 | Ballin | G06F 3/011 704/8 |
| 2012/0007859 A1* | 1/2012 | Lee | G06T 13/40 345/419 |
| 2012/0130717 A1 | 5/2012 | Xu | |

FOREIGN PATENT DOCUMENTS

| | | |
|---|---|---|
| WO | 2004/086208 A2 | 10/2004 |
| WO | 2004086208 | 10/2004 |
| WO | 2005106762 | 11/2005 |
| WO | 2015016723 | 2/2015 |

OTHER PUBLICATIONS

Nageswaran et al. "A configurable simulation environment for the efficient simulation of large-scale spiking neural networks on graphics processors." Neural Networks, vol. 22 (2009), pp. 791-800.

* cited by examiner

SYSTEM FOR NEUROBEHAVIORUAL ANIMATION

This application is a Continuation of U.S. application Ser. No. 14/909,570 filed 2 Feb. 2016, which is a National Stage Application of PCT/NZ2014/000156, filed 4 Aug. 2014, which claims benefit of U.S. Application No. 62/005,195, filed 30 May 2014 and which applications are hereby incorporated by reference in their entireties. To the extent appropriate, a claim of priority is made to each of the above disclosed applications.

FIELD OF THE INVENTION

The present invention relates to a system and method of simulating a virtual object or digital entity capable of animation. The invention has particular application to a method and system for animation using biologically based models, or behavioural models, particularly neurobehavioural models.

BACKGROUND OF INVENTION

As animation and digital technology have moved forward the interface or interaction between a human user and a computer or digital entity has developed significantly. A human-like machine or computer system able to process information intelligently, interact and present itself in a human-like manner is desirable. This is in part because human users interact better with human-like systems and/or robots. Secondly a more human-like system may have more realistic actions, responses and animations, thus reducing perceived technology barriers including the uncanny valley effect.

Animations of this type present a number of significant technical problems. Firstly, the human-like or animal-like function needs to be modelled, which in itself is extremely challenging. Then there is the challenge of taking the human-like function and using it to create a visual or graphical response that is believable to a user or viewer. One example of a difficult response is facial expression. If the system is one which interacts with a user i.e. is interactive, then there is the additional challenge of processing visual and/or audio input data.

These challenges present technical problems. The human-like models need to be integrated with graphics, animation and sensors in such a way that the system is flexible (it may need to be changed depending on the required application) and usable by a programmer/developer (the systems should be relatively intuitive or at least capable of being generally understood by a programmer) while also being able to be compiled and run efficiently.

Existing systems do not adequately address these problems. Some known systems are discussed below.

Animation Type Programs

The controls systems and signal processing fields have produced visual programming languages such as Simulink™ and VisSim™. The use of these visual systems has broadened into other fields as the systems provide an effective way to create a system and have programming code automatically generated. In a typical example a Simulink system may be built by connecting a series of block units (the block units representing for example an electrical component or group of electrical components) so as to link inputs and outputs as desired. This system is then compiled by evaluating the block structure and system attributes, reconstructing the model in a flattened structure, and ordering the block operations. In this sense the visual design is being used to create an understandable view of the model. However the model is operating in an ordered and centralised manner. Similar visual type programs are also known to make coding or circuit arrangement more straightforward.

Animation and 3D drawing programs are also known, for example Autodesk Maya™ uses node graph architecture to represent complex 3D graphics. Autodesk Maya allows animations to be produced and structured over multiple different levels. Instructions may then be supplied to the animation to encourage interaction with an environment. Some programs interface between animation and functional aspects including Max™ visual programming using Jitter. In these cases the graphics engine is substantially separate from, but controlled by, some other program or means (such as sound for Jitter). In other cases the complexity of animation simulations is overcome through the use of a limited set of possible actions. For example Havok Animation Studio™ (HAS) provides efficient character animation through the use of finite state machines (FSM). With the university of Southern California's (USCs) institute for creative technologies' (ICTs) Virtual Human toolkit, Cerebella, automatic generation of animated physical behaviours can be generated base upon accompanying dialogue however the Cerebella requires the input of detailed information about a character's mental state to create a suitable animation.

Neural Models Systems

Neural network based models, including programs such as SNNS and Emergent provide a variety of neural network environments. In different programs the models may provide biological type neurons or may build artificial neural networks. An effective neural network may contain many hundreds or thousands of neurons to simulate even straightforward models. The complexity in using large neural networks led to attempts to build artificial intelligence (AI) based devices. Social or personal robots, such as those developed by MIT Leonardo, appear to have human-like qualities. However they must be programmed in rigid and inflexible manners, typically they require specific implementation of possible actions and are dependent on certain hardware or inflexible.

Artificial Intelligent Robots

Neuro-robotic and/or brain based devices attempt to produce human like systems by copying brain based functions to create desired interactions. These models are typically very large, replicating complete brain systems from low level neurons and linking systems with biological-like interface systems. Brain based devices are robots built to emulate behaviour generated by nervous systems. These typically attempt to have human-like actions and an array of sensors but do not provide an interactive experience through interaction with humans. Brain based devices are designed for particular robots or applications and typically lack broad support for a range of different operations.

In summary known systems do not have the ability to adequately perform one or more of the following:
  accommodate multiple models having different levels of simulation detail;
  perform high level and low level simulations;
  integrate and prioritise animation and graphics as part of the simulation;
  provide visual or animated outputs of multiple models that may together comprise the simulated system;
  provide an environment which has the required flexibility to adjust, remove or replicate model components;

provide an environment which is readily understandable to a modeller or developer provide an animation system based on biological neural systems.

provide learning abilities

OBJECTS OF THE INVENTION

It is an object of the present invention to provide a computer implemented system or method for simulating a virtual object which may be able to overcome or at least ameliorate one or more of the above problems, or which will at least provide a useful alternative.

It is a further object of the present invention to provide a computer implemented system or method for providing an animated real or virtual object or digital entity based on a neurobehavioural model.

It is a further object of the present invention to provide a computer implemented system or method for describing a digital entity based on a neurobehavioural model.

It is a further object of the present invention to provide an avatar with increased complexity, detail, richness or responsiveness to stimulus and a system for controlling avatars which is interactive and allows adjustment of the characteristics of interaction.

Further objects of the invention will become apparent from the following description.

BRIEF SUMMARY OF THE INVENTION

In one aspect the invention addresses the technical problem of flexibly integrating a real-world input stimulus with virtual neuro-behavioural models or model components in a machine so that the machine provides an interactive animation.

In another aspect the invention addresses the technical problem of using a machine to integrate individual neural or neurobehavioural models of different scale.

In another aspect the invention addresses the technical problem of allowing relationships between model components to be varied or changed so that a programmer may use the machine to easily identify and implement changes in the overall neuro-behavioural model, or changes in the animation or an interactive aspect of the animation.

In a first aspect the invention may broadly provide a computer implemented system for animating a virtual object or digital entity, the system including a plurality of modules having a computational element and a graphical element, the modules being arranged in a required structure, each module having at least one variable and being associated with at least one connector, wherein the connectors link variables between modules across the structure, and the modules together provide a neurobehavioural model.

In one embodiment the modules are arranged in a structure such as a hierarchical structure. In one embodiment the hierarchy comprises a tree structure.

In one embodiment the structure is derived from a biological property of biological structure of the animated object.

In one embodiment the structure is derived from an evolutionary neural structure.

The hierarchy may be a tree structure, and may be dependent on a property of the animated object. For example, the hierarchical structure may be derived from biological properties or structure present in, or required by, the animated object. Thus if the object is a human face, the structure may include a hierarchy in which a module including computational and graphical features relating to the cornea is dependent from (hierarchically inferior to) a module relating to the eye.

The hierarchical structure may additionally or alternatively relate to evolutionary properties or structure of the simulated object, for example evolutionary brain or neural structure.

The use of a tree structure facilitates identification of module function within the context of the simulated object.

The use of connectors provides significant flexibility, and allows variables to be linked across multiple modules creating the links between modules that form a complex neurobehavioural model. The connectors also assist when reducing repetition of model features and provide greater efficiency in modelling systems and in the operation of systems as they clearly indicate how the system is linked.

In one embodiment the system comprises at least one module includes an audial or graphical or visual input or stimuli and at least one module having an audial or graphical or visual output.

In one embodiment a portion of the system is representative of a brain.

In one embodiment the graphical element of each module may be toggled between visible and hidden.

In one embodiment a module may have more than one possible graphical element.

In one embodiment the graphical element of one or more modules comprises a representation of the computational element.

The graphical element may provide in module support for CPUs, shaders and other graphical tools so as there are straightforward means to create a graphical output for each or any of the modules. For instance a module's neuron activity could be connected to a colour, audial or visual output without having to create a new module.

In one embodiment a module represents one or more neurons.

In one embodiment a module may represent a biological model.

In one embodiment at least one of the modules may represent a high level system and at least one of the modules may represent a low-level system.

In one embodiment variables from a module may be linked to any of the plurality of modules by a connector.

In one embodiment the modules may have additional modules related to it through the required structure which perform a portion of the modules operation.

In one embodiment at least one of the modules is an association module which links inputs and outputs of the module through variable weights.

In one embodiment the association module has fixed weights.

In one embodiment the graphical element of a module may be switched on or off.

In one embodiment a module may have multiple graphical elements, each element having a separate graphical output.

In one embodiment the required structure establishes the relationship between modules.

In one embodiment the plurality of modules may have a transformation element.

In one embodiment the transformation element adapts the graphical output of the module based on modules linked by the required structure.

In one embodiment at least one of the plurality of modules has a graphical input.

In one embodiment the system has at least one graphical output.

In one embodiment one of the plurality of modules produces a graphical output of a linked variable.

In one embodiment one of the plurality of modules has an input from an external stimulus/stimuli.

In one embodiment the system is capable of learning from an external stimulus/i.

In one embodiment the system provides stimuli externally.

In one embodiment the system is interactive with a user or environment.

In one embodiment one or more of the modules has a learning or memory element,

In one embodiment the learning element is implemented by an association element.

In one embodiment the association element is a synapse weights module.

In one embodiment the operation of a module is modulated by a modulating value connected to the module.

In one embodiment the modulating value is related to a neurotransmitter/neuromodulator.

In one embodiment each module performs an action when the model is time-stepped.

In one embodiment the object may be a virtual object.

In one embodiment the connectors may communicate using a standardised network format.

In one embodiment the connectors may communicate time-varying data.

In one embodiment the connectors may introduce timing and/or delay attributes.

In one embodiment the timing and/or delay elements may depend on a property of the connection or structure.

In another aspect the invention may broadly provide a computer implemented system for animating an object or digital entity, the system including a plurality of modules having a computational element and a graphical element,
  each computational element having a module type and at least one variable, and being associated with at least one connector,
  wherein the connectors link variables between modules and the linked modules together are representative of a graphical and computational model of the animated virtual object.

In one embodiment the system comprises an input for receiving an audial or visual input stimulus.

In an embodiment the invention may comprise a sensing element.

In another aspect the invention may broadly provide a computer implemented system for animating an object, the system including a plurality of modules,
  each module having a type selected from an interface type, an animation type and a neuron type,
  each module having a variable, and being associated with a connector,
  wherein the connectors link variables between modules and the linked modules together are representative of a graphical and computational model of the animated object.

In an embodiment each module may be selected from a plurality of pre-defined modules.

In an embodiment the system may comprise an input module which is an interface type and an output module which is an animation type module.

In an embodiment the system may include one or a plurality of learning modules.

In an embodiment the inputs and/or outputs may include graphical or computational information.

In an embodiment the modules are arranged to mimic a biological structure.

In an embodiment the model is a neurobehavioural model.

In yet another aspect a method of programming an animation is provided, the method comprising the steps of:
  creating a required structure of modules, each module associated with a portion of the animation and able to comprise a computation element, a graphic element, a transformation element, and a set of inputs and/or outputs, wherein the computation and graphic elements are associated with the portion of the animation,
  creating a plurality of connections between a plurality of the modules, the connections occurring between the inputs and outputs of each module,
  wherein the hierarchy of modules and the plurality of connections define an animated system and the model controls the animated system.

In an embodiment the required structure is a hierarchy.

In an embodiment the inputs and/or outputs are variables of the modules.

In an embodiment the hierarchy and/or connections may replicate neurobehavioural systems.

In an embodiment the hierarchy and/or connections may replicate neural circuits.

In an embodiment the method may comprise the further step of varying the connections between elements to vary the animation.

In an embodiment the method one or more of the modules may be learning modules.

In an embodiment the method may comprise the further step of allowing a learning module to adapt based on the set of inputs and/or outputs.

In an embodiment the plasticity of the learning module may be altered.

In an embodiment the method comprises the step of selecting each of the modules from a plurality of predefined modules or module types.

In an embodiment the method comprises the step of adjusting a predefined module to provide a desired operation.

In an embodiment one or more of the required structure of modules is a learning module.

In an embodiment the method comprises the step of allowing a learning module to adapt based on input data then fixing the operation of a learning module.

In another aspect the invention may broadly provide a computer implemented method of animating an object or digital entity, the method including the steps of:
  providing a plurality of modules which together simulate a neurobehavioural model, a plurality of the modules each having a graphical element, and
  processing the modules such that a transformation of an anatomical feature of the object or entity results in corresponding transformation of one or more sub-parts of that anatomical feature.

In another aspect the invention may broadly provide a computer implemented method of animating an object or digital entity, the method including the steps of:
  providing a plurality of modules which together provide a neurobehavioural model, a plurality of the modules each having a graphical element,
  processing the modules in a time stepped manner to provide graphical information for each module in each time step,
  evaluating a real time constraint, and
  rendering the graphical information if the real time constraint is satisfied.

In an embodiment the rendering of the graphical information may occur after a plurality of time-steps have been processed.

In another aspect the invention may broadly provide a computer implemented system for animating an object or digital entity, the system including a plurality of modules capable of having a computational element, a graphical element and one or more variables,
 wherein at least one of the plurality of modules creates a graphical output feature,
 at least one of the plurality of modules is adapted to change the appearance of the graphical output feature, and
 at least one of the plurality of modules is an association module which comprises weights to link input and output variables.

In an embodiment at least one of the plurality of modules is a learning module adapted to alter the future actions of the animated virtual object or digital entity.

In an embodiment the association module is a learning module.

In an embodiment the plasticity of the learning module is adjustable to control the rate of learning.

In an embodiment at least one of the plurality of modules is a learning module in which the learning has been stopped.

In an embodiment the association module has inputs from one or more modules forming a neurobehavioural model and outputs to one or more modules forming a graphical output.

In an embodiment the association module weights are fixed.

In an embodiment the association weights are fixed based on external data.

In an embodiment the association module weights represent a graphical output.

In an embodiment each of a plurality of the plurality of modules are association modules represent alternative graphical outputs.

In an embodiment each of the alternative graphical outputs may be displayed separately or may be displayed in a blended combination.

In an embodiment the graphical output may represent a face.

In an embodiment the alternative graphical outputs may represent a range of facial expressions. In an embodiment the graphical output is a positioning signal to one or more of a plurality of graphical output components.

In an embodiment the graphical output components represent muscles.

In a further aspect the invention may be broadly described as a computer game, having one or more characters as described in the other aspects.

In a further aspect the invention may be broadly described as an interactive display showing a virtual object or digital entity as describe in the other aspects.

In an embodiment the interactive display may be an advertising display.

In another aspect the invention may broadly provide a computer implemented system for generating interactive behaviour, the system including a plurality of modules having a computational element and a graphical element, the modules being arranged in a required structure, each module having at least one variable and being associated with at least one connector, wherein the connectors link variables between modules across the structure, and the modules together provide a behavioural or neurobehavioural model.

In another aspect the invention may broadly provide a computer implemented system for generating interactive behaviour, the system including a plurality of modules having a computational element and a graphical element,
 at least one of the plurality of modules receiving an external stimulus,
 at least one of the plurality of modules providing an external output,
 at least one of the plurality of modules creating an association between the external stimulus and the external output,
 wherein the association affects future system behaviour such that the external output responds a change in the external stimulus.

In an embodiment the association provides the system with a learning behaviour.

In an embodiment at least one of the modules creates an association between a first internal stimulus and a second internal stimulus or the external output.

In an embodiment at least one of plurality of modules has a modulating means to modulate the function of one of the plurality of modules.

In another aspect the invention may broadly provide a computer implemented method of animating a virtual object or digital entity, the method including the steps of:
 Instantiating a plurality of modules from a plurality of module templates,
 Defining, for the plurality of modules a function, input and output,
 Defining connections between the inputs and outputs of the plurality of modules, wherein the plurality of modules and connections form a behavioural or neurobehavioural model.

In an embodiment at least one of the inputs and/or outputs to at least one of the plurality of modules is an external stimuli or output.

In an embodiment any one or more of the plurality of modules or connections may have a visualisation output.

In another aspect the invention may broadly provide a computer implemented system for creating an animated virtual object or digital entity, the system comprising;
 a plurality of module templates able to have a computational element and a graphical element,
 a first describing means which specifies the function and variables of one or more selected modules, each of the selected modules being based on one of the plurality of module templates,
 a second describing means which specifies a plurality of connections between the variables of the one or more selected modules,
 wherein the one or more selected modules are connected to as to create a behavioural or neurobehavioural model.

In an embodiment at least one of the module templates is a neuron model.

In an embodiment at least one of the module templates is a delay model.

In an embodiment at least one of the module templates is an association model.

In an embodiment the system further comprising a third describing means which specifies the relationships between modules.

In an embodiment the relationship is hierarchical.

In an embodiment the structure or hierarchy may be representative or non-representative of a biological system or structure.

In an embodiment each module can time-step.

In a further aspect the invention may broadly provide control of a computer generated display, effect or avatar using a network of modules of defined functionality connected to communicate using a format for time-varying data wherein the connections introduce timing and/or delay attributes to the time-varying data dependent on the arrangement of modules in a network so that the responses caused by the network can be adjusted by rearranging the modules or the connections.

In a further aspect the invention may be broadly described as a computer system operable to control a digital entity in response to data defining stimulus for the digital entity, the system comprising a network of functional modules of code, the network operable to receive data characterising the stimulus and operable to generate data defining a response for the digital entity, wherein the network comprises code defining:
- one or more variables for each functional module, the variables configured for a time-based data format standardised for the network and associated with at least one connector carrying time-varying data between transmitting and receiving variables of modules;
- location-reference data defined for each module to allow a position of the module to be defined relative to one or more other modules;
- time-adjustors operable to adjust the timing of time-varying data transferred between transmitting and receiving variables, wherein the time-varying data is dependent on the position of a module of a transmitting variable to a module receiving of a receiving variable,
- one or more functional operations defined for each of a plurality of functional modules and operable on time-varying data carried in the time-varying signals received at variables defined for the functional module, whereby operations on time-varying data received at two receiving variables receiving data transferred from two different functional modules have an effect that is adjustable by an adjusted relative position of the functional modules,
- whereby the response of the avatar is adjustable.

The time-adjustors may comprise a set of transmission lines operable to interconnect transmitting and receiving variables and to introduce a time delay dependent on the difference in location of the modules of the transmitting and receiving variables.

The network may comprise transformers operable to allow two or more variables to be combined whereby two transmitting variables can be connected with a single receiving connector.

The functional modules may comprise a wrapper operable to parse data in a time-based format to a given format to allow code operating on data that is not in a time-based format to be used in a functional module in the network which is connected using the standardised time based format.

The functional operations may have parameters that are adjustable to allow adjustment of the response of the avatar.

The functional operations may have parameters that are adjustable depending on network parameters that propagate through the network. The propagation may start at a defined location in the network and propagate from that location whereby the parameter may adjust the functional-operations depending on the location of given modules and the extent of propagation of the propagated network parameters. The network parameters may be modulating values.

The network may be operable to receive data or inputs to determine location-reference data.

As used herein, data is used broadly to cover encoded information and may include instances of data-type and event types and may include streamed data.

The network may include time adjustment means independent of the relative positions of functional-modules to allow delays or time-advancements of time-varying data to be defined to adjust the response for the avatar to stimulus.

The functional operations may be operable to define associations of characteristics of time varying data from transmitting variables of two or more functional modules. The response for the avatar to stimulus may be adjustable by adjustment of the relative positions of functional modules in the network and/or to adjustments to the functional operations of one or more functional modules.

The response of the avatar to stimulus as controlled by the system can be configured by the functionality of the modules, the connection of modules and the relative position of modules in the network.

The time adjustment means may comprise a delay introduced to the data in a time-based format.

The network may comprise code defining a set of connectors connecting the transformers and modules, each connector comprising a time adjuster operable to delay to the time-varying signals.

The network may comprise code defining a set of transformers operable to combine time-varying data from two or more transmitting variables so as to allow connection to a single receiving variables.

The operation of the network may dependent on both the functionality of the modules and the relative positions of modules in the network.

In some embodiments the transformers do not introduce any time delay as seen by the functional modules.

In an embodiment modules are selected and/or positioned by an operator.

In an embodiment system may comprise a configuration interface operable to receive adjustments to location-reference data.

The configuration interface may be operable to allow selected connection of modules to configure the network whereby the control of the system and/or responses of the avatar may be configured. The configuration may be operable to display a representation of the relative positions of the functional modules and the connection of the modules. The configuration may be operable to display a representation of the network. The configuration may be operable to display the avatar. The configuration may be selected to allow the user to observe the network operating and/or adjust the module position and/or selection of the modules.

In some embodiments data characterising stimulus is received from a camera. In some embodiments the system may be operable to control a single avatar or multiple avatars individually or collectively. In other embodiments the system may be provided within the code of an application, such as a game, and data characterising the stimulus may be received within the game.

One or more systems may be used to generate multiple characters represented by avatars where the similar networks are configured differently to diversify the characteristic responses of the avatars. This may be used to provide a set of avatars or digital entities with different characteristic responses. Different configurations may be achieved by changing parameter settings. For instance different personalities may be characterised by sensitivities or response levels (e.g. by changing threshold variables) to neurotransmitters, neuromodulators or other signals in the model. Different configurations could also be achieved by adapting the system topology or layout, creating different types of structure in the neurobehavioural model. The topology or layout may be changed by adjusting connections between modules, the function of modules or the structure or relationships between the modules.

Embodiments of the present invention allow a range of different types of code to be included in functional modules which are interconnected via connectors that use a standardised time-based format so diverse functional code can be included in the same network.

Another aspect of the present invention provides a facial graphics rendering system, comprising:
- a graphics rendering layer which receives muscle actuation/position data defining degrees of actuation of a set of facial animation muscles and which generates graphics image data;
- a muscle actuation/integration layer receiving nerve actuation data defining a degrees of nerve activation for a given set of animation nerves and generating muscle actuation data for a set of activation muscles defined for the muscle actuation layer;
- a nerve activation layer receiving expression data defining an expression and generating nerve activation data defining a combination of animation nerves to be activated and defining a degree of activation for each nerve.

Each layer may contain data defining properties of the nerves, muscles and skin/fat/etc. The muscle layer/graphics rendering layer receives stimulus data and generates feedback date.

In another aspect the invention may broadly provide a computer system operable to control a digital entity in response to an external stimulus, the system comprising a network of functional modules of code, the network operable to receive data characterising the stimulus and operable to generate data defining a response for the digital entity, wherein the network comprises:
- one or more variables for each functional module,
- a structure to allow a position of the module to be defined relative to one or more other modules;
- one or more connectors, the one or more variables being associated with at least one connector carrying data between variables of modules;
- wherein the connectors are selectively adjustable to connect different modules to thereby change or adjust the behaviour of the digital entity in response to the external stimulus.

In another aspect the invention may broadly provide a computer programmed or operable to implement the system of any one of the preceding embodiments.

In another aspect the invention may broadly provide one or more computer readable media storing computer-usable instructions that, when used by a computing device, causes the computing device to implement the system of any one of the preceding embodiments.

In another aspect the invention may broadly provide a method of controlling a digital entity in response to an external stimulus, the method comprising:
- receiving data characterising the stimulus;
- processing the data in a plurality of interconnected modules together representative of a neuro-behavioural model to provide an output defining a response of the digital entity to the external stimulus;
- altering a connection between one or more modules, or altering a variable in one or more modules in response to the output.

In a further aspect the invention may broadly provide a computing device operable to perform the method of controlling a digital entity.

In a further aspect the invention may broadly provide one or more computer readable media storing computer-usable instructions that, when used by a computing device, causes the computing device to implement the method of controlling a digital entity.

Any of the above described embodiments may relate to any of the above aspects.

According to a further aspect the present invention provides a method and system substantially as herein described with reference to the accompanying drawings.

Further aspects of this invention which should be considered in all its novel aspects will become apparent from the following description given by way of example of a possible embodiment thereof.

Any discussion of the prior art throughout the specification should in no way be considered as an admission that such prior art is widely known or forms part of common general knowledge in the field.

DESCRIPTION OF ONE OR MORE EMBODIMENTS

Figure 1A:
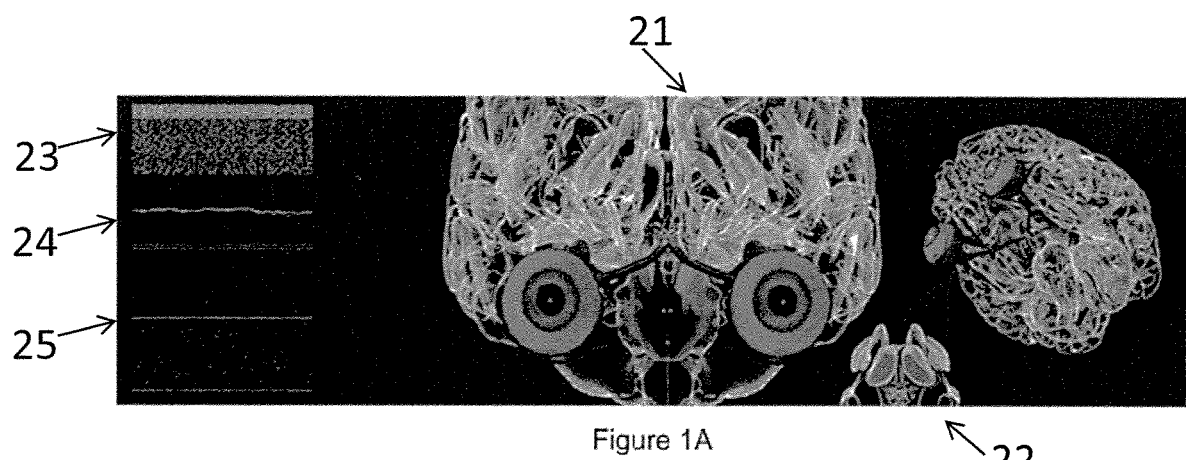
FIG. 1a: Shows an embodiment of the invention where a model of the brain is displayed.

The invention is described herein is implemented using a computer. Referring to FIG. 1b the computer has an input means 201 for inputting information, a processor means 202 and an output means 203. The processor means for processing the information may communicate with a memory means 204 for storage or retrieval of information. Inputs or stimuli may originate from real-world stimuli comprising for example an input from one or more of a camera, electromagnetic transducer, audio transducer, keyboard or other known systems. Other stimuli include graphical user interfaces, hardware consoles, streamed data, and data from cloud computers, computer indexes, the world-wide web or a variety of sensors. The output means sends signals to a display unit or another machine e.g. robot. The memory means may be a computer readable medium suitable for storing code, the code executable on a processor. Alternatively the model or part thereof may be a circuit. Embodiments of the invention include models with applications in the form of any one or more of the following games, consoles, vending machines and advertisements, mobile devices and cloud-computing devices.

In an embodiment of the invention biological behaviour is simulated through biological models which provide graphical outputs. Graphical outputs may refer to any form of visual or presented output. For instance the brain processes which give rise to behaviour and social learning are used to animate lifelike models of the face which can interact with a user. In another embodiment of the invention the model may be applied to an interactive animation. The animation may incorporate multi-scale computational models of basic neural systems involved in interactive behaviour and learning. Each computational unit or module may function as a self-contained black-box, capable of implementing a range of models at any scale (e.g. from a single neuron to a network). The modules are then linkable to create a network or structure which forms the model.

A neurobehavioural model uses underlying neural pathways or circuits to create behaviour. The neural circuits created may range in complexity from relatively simple feedback loops or neural nets to complex representations of biological systems. Therefore the virtual objects or digital entities include both large models of humans or animals, such as a baby face as well as any other model represented, or capable of being used, in a virtual or computer created or implemented environment. In some cases the objects or entities may not be complete, they may be limited to a portion of an entity, for instance a body portion such as a hand or face; in particular where a full model is not required. An avatar or other representation of a person or object is included in the definition of a digital entity or virtual object. In some embodiments the character or behaviour of the digital entity or virtual object may be variable through the neurobehavioural model. The system animates the digital entity or virtual object so as to allow realistic movement or change of the entity or object.

The animation may synthesize or replicate behaviour and present this behaviour through advanced 3D computer graphics models. In a broad sense the model may provide a behavioural system which can adapt to external stimuli, where external stimuli refer to stimuli separate from the model's internal stimuli. For instance an embodiment may interact with a person through a screen interface or may be implemented as a robot. This functionality may be achieved through neural type systems or a mixture of neural type systems and functional replacements for neural systems. An embodiment of the system may be referred to as self-animated because the animation is performed from external stimuli using learned methods without it being necessary to intervene with the animation.

In an embodiment of the invention the graphical/animation elements of the model with the computational elements of the model are linked in a required structure, preferably a hierarchical structure. The structures allow sections of code to be contained or grouped, meaning that the sections can be reproduced or moved as a group of components. The structure may include dependent structures including tree-like elements. In an alternative arrangement the hierarchical structure may be implemented in another form to create a required structure. In an embodiment multiple hierarchies may be used. An important feature of the required structure is that it provides a further link between the modules, the link focusing on the relationships or physical or pseudo-physical arrangements. In this way the required structure provides a backbone or relational structure for each of the modules in the model. In a preferred embodiment the required structure is arranged hierarchically so as to easily display and make understood the structure. This allows an improved description of the model and allows a modeller to more efficiently build a model as the modules containing graphical and computational elements are related in a clear and buildable manner.

An embodiment of the invention may include a model defined by a series of modules in a hierarchical structure. This may be similar to the way a physical element may be deconstructed into its composite or component parts. Each module may have zero, one or a plurality of dependent modules. The plurality of modules may form a tree-like structure. This structure is used for or related to the graphical structure but is also includes the computational elements. The computational elements may be defined in separate but similarly required/hierarchical structure. Elements may refer to sections, sub modules or portions of code or links to code to carry out the function. Having separate elements of code allows separation of the control of different functionalities in each module. Preferably modules may contain both (or either one of) computational and graphical elements. In a preferred embodiment each module is capable of containing each element and requires only that the element be activated. In this way the structure of the model is clearly observable when viewing the hierarchy and the relationships between modules, their computational elements and graphical elements are clear. Hence the model may provide an improved method of creating a neurobehavioural or psychobehavioural animation. In some embodiments more elements may be present to provide additional features or to separate the module structure. A sensing element may be included in a, a plurality or every module so as to allow inputs from internal or external stimuli.

The graphical elements typically include geometry, shader and texture information or code. These features of the graphical elements can be connected and modified by external modules. The shaders and textures could be used in the general purpose GPU (GPGPU) sense for computation. A typical implementation of a graphical element might be for a virtual face. The face geometry, textures and shaders may be kept in a directory called 'face'. The face directory may also contain computational elements associated with the face. In this way the graphical elements and computational elements are contained in a single module in the required structure, but are also separate to allow management and updating or linking. In particular different graphical elements may be operated, for instance to show the operation of the neural net or movement of the face. For instance a computational element may feed a muscle activation variable from a face nucleus module to the shader or animation deformation module which may:

deform vertices of the face geometry modify the mapping of the texture data being read in (e.g. to change the appearance of the skin based on expression due to blood flow)

modify the shading calculations based on connecting strain information calculated externally to the shader.

The required structure is complemented by the connections between the plurality of modules. These connections or links help to control the complex dynamics and inter-relationships between the computational systems and animation requirements. Connections may link between the inputs and outputs (variables) of any module or element in the model including both graphical and computational modules. This communication and flexibility between the graphical and computational aspects of the model allows a designer/programmer or user to create a very complex model efficiently. There is no requirement to replicate features or actions in separate, or weakly linked, graphical and computational sections of the model. In an embodiment of the invention the inputs and outputs may be preferentially connected to or routed through a high level module so that a branch of the hierarchy may become substantially self-contained. The majority of the connections may then be made to the high level module to avoid reaching into the complexity of the modules inside. The connections, and other model features, provide means to modulate signals in the system. Modulation of signals allows for behaviour to be trainable and the training to be efficient because the training is independent from the detail of the model. For instance a neurotransmitter can be implemented as a connection to multiple models, and its value can be varied to adapt the model or the model behaviour.

Connections may be made between the graphical and computational elements of the modules and these connections provide the means to create a complex and human-like simulation based on complex biological models. Connections may provide an association between a first and second variable (where a variable is an input and/or output of a module). This improves on the prior art systems which allows creation of neural models but which have limited graphics or animation and which limit the interface/s between these. By combining the graphical and computational elements feedback loops and the relationships between the animation and the underlying model can be controlled and/or described. This also allows the model to be updated more efficiently because the inherent relationships may be visible, including real-time and during updating or optimisation.

In an embodiment of the invention each module is connected with other modules to form a network or required structure. In this embodiment variables (shown as points on the modules where lines join the module) are connected by connections (which may be referred to as transmission lines) which connect the variables and may introduce a delay that depends on, or represents, the distance in the network between interconnected modules. In some embodiments the connections determine the delay using or dependent on location reference data associated with connected modules. In other embodiments the delay is introduced within the module or in a separate delay module. In some embodiments a time advancement is used in place of a delay or no delay may be present. The connections may carry time-based data, in the form of a time-signal between modules. The modules operate on the signals in conjunction with other signals to generate a response used to control an avatar or digital entity displayed to a user, for instance on a screen or other digital presentation device. Both the relative timing of received time-based signals and the operations will affect the output of the modules. Therefore the responses of the digital entity, avatar or virtual object and/or the characteristics of the responses may be affected by any one or more of the: choice of modules, choice of the module's functional operations, arrangement of the modules within the network and/or their relative positions and the selection of connections between the modules.

As used herein the term connector or transmission line may be any line of communication suitable to connect two or more variables and may include an object oriented interface. The timing and/or delay attributes may be affected by the connections between modules. For instance in an embodiment where in each time step variables are moved from a transmitting variable to a receiving variable the presence of an intervening module between the transmitting and receiving variables would delay the communication of the data. In other embodiments the connections themselves may have a timing or delay component. Preferably a standardised network or communication format is used so that all modules may communicate between variables. This may require a wrapper or initialisation of the module which defines how code inside the module produces the standardised network format. In an alternative embodiment the position of modules and the visual distance or other location reference data of the modules may affect the timing.

An example model of a brain and facial features is shown in FIG. 1. The model may include biological, computational and graphical elements. Preferably the computational and graphical elements may be broadly or substantially based on biological systems. In one embodiment a biological modelling architecture allows a series of low level modules to be connected, or built into groups which are then connected to form high level components. This may follow or be derived from an evolutionary layering structure or evolutionary neural structure in which simple basic modules are linked and combined to result in complex overall features. The basic modules may provide the core functionality of the modules with high level modules providing additional functionality connected into this more basic system. The biological modelling architecture is then used to build an animation system based on biology. An advantage of the system is that a complex animated system may be constructed by building a plurality of separate, low level modules and the connections between them provide human-like or animal-like capabilities to the model.

Figure 1B:
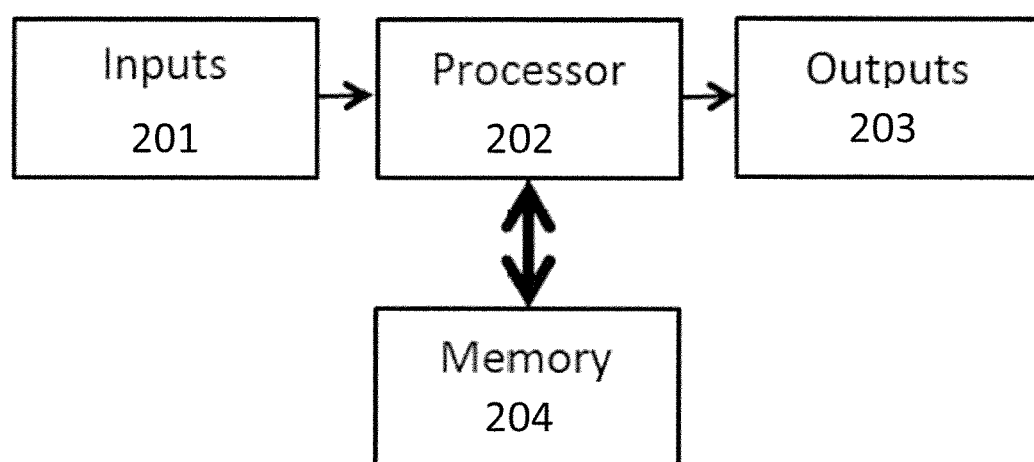
FIG. 1b: Shows a schematic of a computer system for implementing the system.

FIG. 1a demonstrates an overview of the model showing a representation of the brain including some surrounding features. The model may include sub-models of neural systems and neuro-anatomy including scientific model based systems and neural networks systems. In particular biological neural networks of known types may be used. This structure enables visualization of the internal processes generated by computational models giving rise to behaviour. The structure also provides a describable or understandable form of interaction between a user and the system. The model or modules may be driven by theoretical models, data driven empirical models, a combination of these or simplified models. In some embodiments the interactive nature of the model allows the behaviour of the avatar or animation to be varied in order to construct desired behaviour or test behavioural patterns or biological effects.

The creation of an avatar, digital entity or animation such as that of FIG. 1a requires a modelling methodology for construction, visualisation and animation of neural systems. A novel model environment and method for neural models is disclosed and may be referred to as brain language (BL).

BL allows users to create animations and real-time visualisations from biologically based neural network models and allows model effects to be viewed in an interactive context. For instance FIG. 1 shows an image of the brain and eyes 21 of a model, sections of this 22, and variables, inputs or outputs 23, 24, 25. Such a visual environment is not only suitable for creating a model, it is also ideal for model development and visualisation of the model. The visualisation may use a user interface to allow adjustment of the network or allow configuration inputs to be received by a user. The model may take inputs and provide outputs visually, audibly or graphically, using cameras, microphones or any other sensors as required. Different forms of input may require different input modules with appropriate wrappers to incorporate the data into the model.

The BL modelling environment provides two-way communication between a user and the model. In embodiments the model may interface with the user through visual and/or aural communications. This means that the model may make sounds, change orientation or position and react to the user doing the same and that preferably these actions should be realistic and human-like. In one example the model may cry if the user is not looking in the direction of the model. Alternatively the model may monitor and react to sounds or actions in its environment. In further embodiments the sounds or actions in the environment may affect the operation of the model over time. The interactions between the animation, the environment (through sensors) and a neural model are possible because the modelling environment provides a rich structure of interconnection for complex systems. This provides a means to test, improve and optimise the model.

Figure 2:
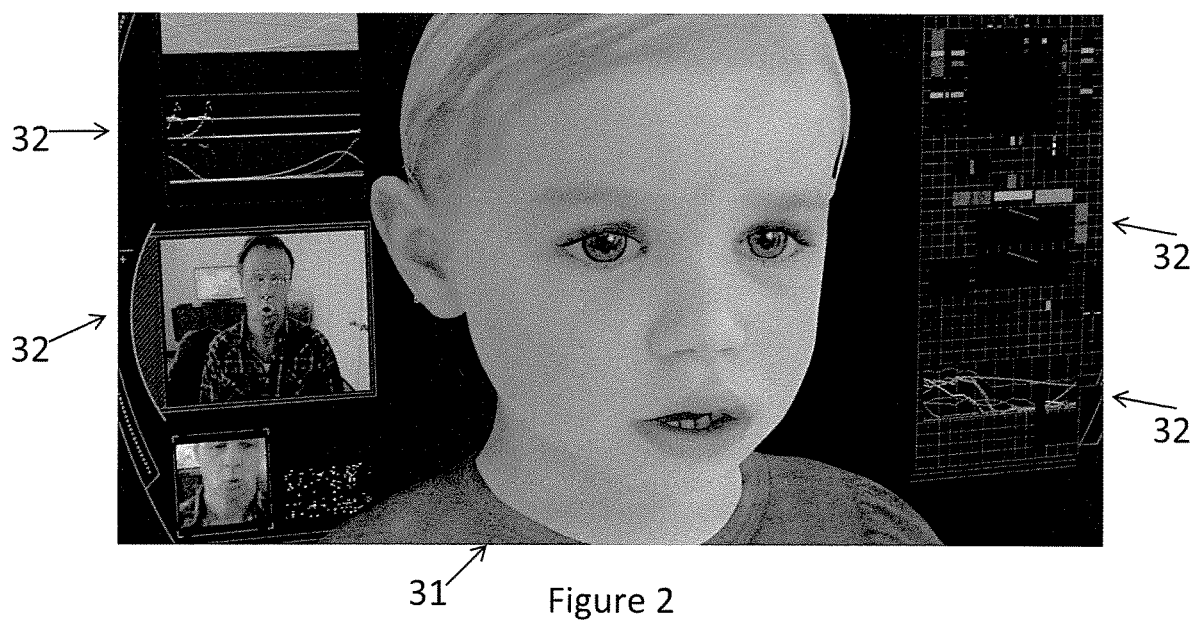
FIG. 2: Shows an embodiment of the invention where a life-like visualisation is displayed.

FIG. 2 demonstrates an animation output which is a 3D representation of the face and upper body of an infant. The output representation may display model results as well as affecting the model. For example the system can analyse video and audio inputs in real time to react to caregivers or peer behaviour using behavioural models. Similarly the model may be affected by the direction the animation is looking and any external sounds or actions. The external face may be represented using biomechanical information or modelling. In animation this is typically based on muscle shapes. In alternative embodiments the output may be as part of a robot, a cartoon figure or other means. These may not directly resemble human or human-like features but may share human-like action or responses. In embodiments based on animal or human-like features the biological basis of the model may allow for or require, realistic modelling restrictions creating a more realistic model. As well as the animated output 31 a number of variables, inputs or outputs 32 may also be shown to improve the understanding of the model.

The system may be able to both describe and animate a digital entity. The description allows the digital entity to be viewed through the structure and arrangement of the model parts. This enables a user to efficiently construct a model as the design and animation are closely coupled together, instead of requiring separate neural model and animation models to be created and then coupled retrospectively. The description of the model may comprise the runtime data and/or a description of what the system is and how the parts of the system are connected. The animation of the digital entity is closely coupled to this description but adds computational and graphical information relating to how the system is run and how each part of the system operates in a time-step. The tight coupling of the model is a feature created by the modules which contain, and directly link graphical, computational and/or transformative elements so that each module forms a segment of the total model. This allows component level modules to be built into a cohesive and coherent whole, or combined to form a structure of connected modules.

In an embodiment a module may include a muscle level component for a facial animation. This may be driven by a neurobehavioural model and may have a graphical element relating to the muscle and a computational element relating to the operation of the muscle. The muscle component may receive an input from the model suggesting a preferred position or action to take. A neural network pattern generator may receive the inputs or expected outputs from a collection of similar muscle components and combine these to form a coherent output effect for a larger muscle or muscle region. Because of the low level control of the graphical output very complex facial expressions can be formed. This is because the model is not simply trying to combine a series of possible expressions, or match a mesh of data points across a face but instead to build facial expressions based on the anatomical or biological systems of an animal or human. Other embodiments, described later, may provide coherent facial expression through a combination of outputs or expressions and finite element elasticity.

The low level control over graphical and computational elements of the model also provides the ability to study aspects of the model at a range of levels of detail. For instance if the action of a particular muscle is important the model can be limited to showing this, while maintaining the computation or operation of the rest of the model. Similarly the model can display both output graphical animation and outputs regarding computation of the model, including graphical outputs of this computation. For instance a model of a human baby may be used to explore the effects of dopamine on blink rate. The primary graphical output may be the face or head of the baby and its facial movements. However a plot of the dopamine level in the baby may also be visualised so as to make a comparison similar to that shown in FIG. 2. In a second example a model of a human baby can be used to interact with a user to model the effects of dopamine on reward learning of a particular behaviour—for example when the baby makes a certain expression, and the user responds positively then the learning effects of dopamine modulated plasticity means this expression becomes more likely to be repeated. The user can see the change in the baby's facial behaviour and also visualize the change in the synaptic weights of a striatal neural network.

In an embodiment visualisation of simulated neural circuits can allow a user to see the neural circuits giving rise to behaviour in action in neuroanatomical context at any given time, or in more schematic displays. A feature of the model is to graphically look below the skin, to see the activity of the neural circuit models contributing to the activation the facial muscles. The range of viewing modalities available in BL allows users to viewer various parts of a model in a neuroanatomical context at will as well as offering more traditional "numerically focused" displays which may be better suited for more abstract models and for live model parameter modification.

The visualisation could be achieved by adding a graphical element, or visualisation element to a dopamine variable or connection from a dopamine variable in an appropriate module in the model. The user may then want to examine the effect of a drug on the dopamine/reward system. This may involve adding a connector from the drug to a module of the neurobehavioural model. The user may want to see how this effects the operation of some portion of the neural system.

Again this could be achieved by creating or activating a graphical or visualisation element associated with that portion of the system, and this may be activated at a plurality of levels, from a component of the face to an individual neuron module. This is possible because the simulation is built from a combination of modules with a required structure, the modules having computational and graphical elements so that both the computation or data based processing and the graphical processing can be investigated, described and adapted, either individually or separably. The module based approach also allows further detail, in either computation or display elements, to be added by introducing further modules in the required structure. In this way the state of the model which generates, for instance, facial behaviour can be visualized through graphs and schematics or by exploring the activity mapped to the underlying neuroanatomy.

Animation/Graphics

FIG. 2 shows an animation having a human-like face. The generation and animation of a realistic face and facial expressions may be achieved through the use of the model. A neural control system is preferred as a generative model for facial animation as it constructs facial motion from the building blocks of expression. This may help to create a more consistant overall expression in the digital entity or virtual object. The neural control of facial movements requires the use of multiple parallel systems including voluntary and emotive systems which are anatomically and functionally distinct up to the facial nucleus. The ability to have control of the facial animation or expression based on connections to the neural system provides means to produce realistic animation and configure and optimize the animation so as to make it more human-like. The facial animation of the model may use a neuroanatomical model based on the architecture of the facial motor system. This may take inputs from other modules associated with the model, although preferably will be based on the known scientific models. In an embodiment of the system the face, or other graphical feature, may form a separate portion of the structure or a separate structure in order to focus on the graphical requirements of a realistic face. This facial structure would then be connected or linked to the neurobehavioural model in order to be controlled.

In an embodiment of the invention a complex graphical output, such as a face, may be formed by a series of modules that contain only, or largely graphical data. In this way the face may be more independent of the computational aspect to allow changing of facial (or other graphical image) details. The face may be arranged as a set of modules, with a first module representing the face and a plurality of modules in a required structure then representing sub features. In a first example the modules may represent only the surface of the face, or in a second example the modules may represent the face and muscle or tissue elements behind the face. The features of a face may be obtained as discussed above where a series of facial expressions is calculated recorded and described. In an embodiment the facial expressions may be blended in the model to create a composite expression. An advantage of using blended facial expressions is that this ensures that an expression is complete and uses the entirety of the required muscles. For instance a person's forced smile may be differentiable from a real smile by the non-symmetrical nature of the smile as individual muscles are being instructed instead of an organised smile pattern of muscles operating together.

Figure 8:
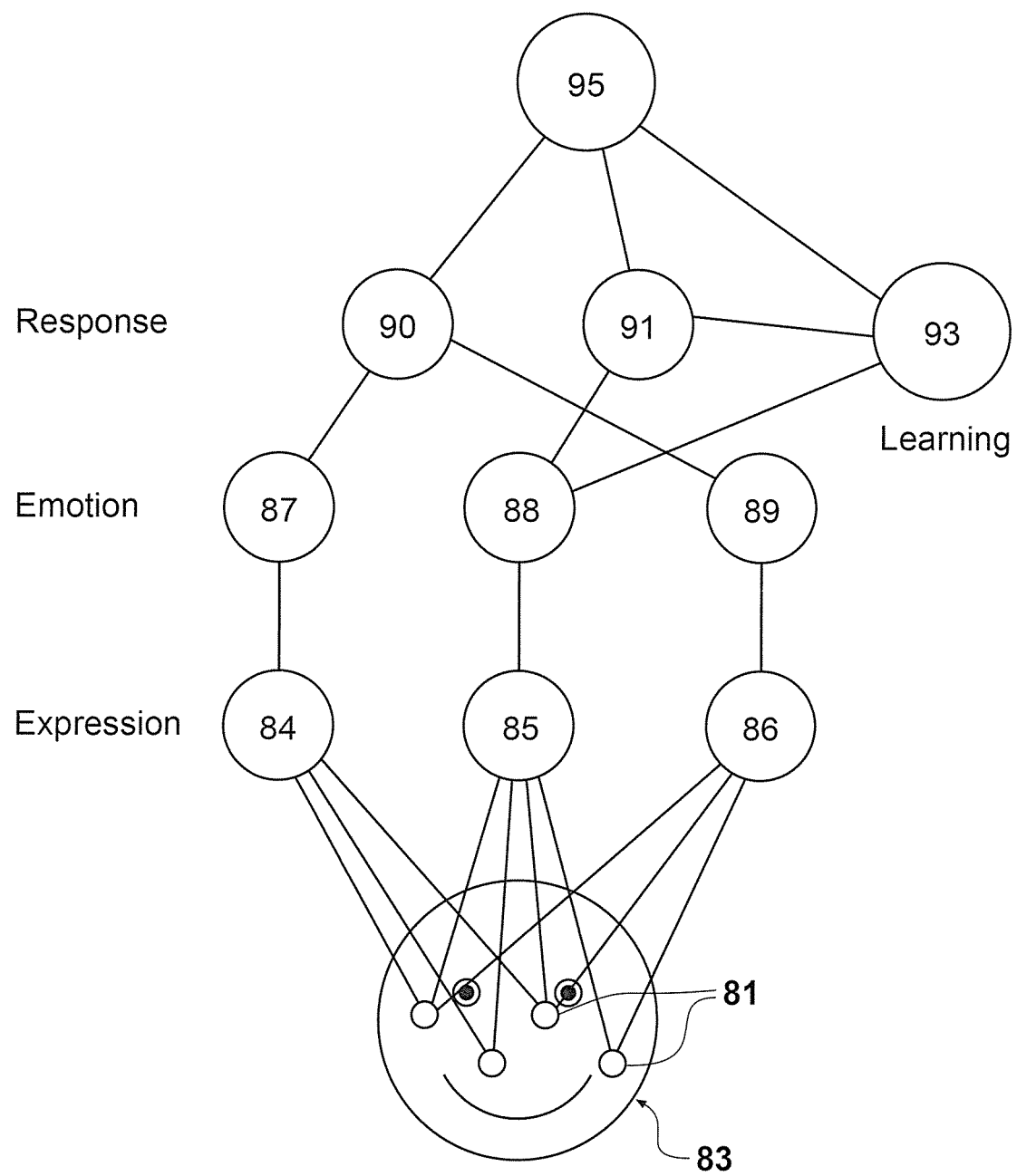
FIG. 8: Shows a schematic view of an embodiment of the system comprising a complexgraphical output.

Referring now to FIG. 8 an embodiment of the invention shows the facial expressions of a face controlled through a plurality of modules. The face is represented by a plurality of muscle shapes 81 or facial features which represent the surface of the dace. The actions and graphical representation of these muscle shapes is provide by a series of expression modules 84, 85, 86. The expression modules may have predefined weightings for the muscle shapes 81 so that when triggered they provide the weightings, strengths or inputs to the face to create the appropriate expression. The predefined weightings may be obtained from earlier data capture. For instance the expression modules may relate to a frown 84, smile 85 and angry expression 86. The facial expressions may be controlled by one or more pattern generators used as expression generators 87, 88, 89. The expression generators 87-89 provide a means to blend and shape multiple expression modules. For instance a parent may require an angry frown which could be achieved by blending the angry expression and frown faces. In other examples the expressions may be more distinct, for instance combining smile and surprise to create an overall expression of a pleasant surprise. The expression generators may include pre-trained response curves based on their input variables.

The expression generators may be linked to the neurobehavioural model, and in particular to modules directed to emotion. For example they may be connected to modules for punishment 90 or reward 91. The expression generators may take an input of the any one or more of the apparent emotions of the system and configure a suitable blend of facial expressions for the output. The system may be contained under an overall structural element 95 in order to provide the required structure and support the organisation of the system. In a preferred embodiment the system includes one or more learning elements associated with the facial expression system. For instance the learning elements may change the weights of the expression generators so that a model which has been rewarded for an extended period of time for making a particular expression has a stronger weighting towards the rewarded expression so exhibits the expression more frequently. Learning through conditioning can also be made by the model. For example an associative module which associates stimulus induced sensory activity with emotional triggering of behaviour after conditioning will trigger the behaviour through exposure to the stimulus alone. This is analogous to 'classical conditioning' or Pavlovian conditioning.

The graphical output or animation may be composed through the use of brainstem or cortical pattern generators, modelled using biologically plausible recurrent neural network models formed as modules, and produce activity which is resolved in the facial nucleus before being output as animation weights. The graphical output of the model, and the particular face model, as shown is designed to be driven by muscle activations generated from simulated motor neurons. The motor neurons may be contained in a separate module or may form part of the graphical portion of a module. The facial expression geometric manifold is created by modelling the effect of individual muscle activations and significantly non-linear combined activations. The graphical animation may use procedures including scanning, geometric modelling and biomechanical simulation.

The facial expression manifold may be generated using a comprehensive biomechanical simulation of individual muscle activations. This provides an advantage that the graphical output is a combination of each of an array of individual features but forms a single coherent and flexible whole. The system may also allow sections to be turned on or off so that obscured portions may be viewed, or certain features may be concentrated on. When the model contained in the system is simulating a human brain, or parts thereof, switching off certain sections of the computational model may cause the system to behave as though it had a received a brain injury. This may be referred to as a synthetic lesion.

The system may also allow facial expressions to be artistically modelled so as to allow the construction of stylized characters or cartoons sharing human-like qualities. An advantage of using physically based models is the compatibility with future robotic implementations of the model, for instance in a humanoid type robot. The facial expression may be based on a limited set of face biomechanics however in a preferred embodiment the structure is closely matched to the anatomy of the face. Digital entities may include avatars as well as displays or audio-visual outputs including lighting, cartoon characters, colours or various other outputs or displays known to the reader.

The system may include models of deep and superficial fat layers, deep and superficial muscle, fascia and/or connective tissue. The effects of deformation or facial movement on the face may be acquired through the use of large deformation Finite Element Elasticity, which is used to deform the face from rest position through simulated muscle activation. The action of each muscle in isolation and in combination with commonly co-activated muscles may be simulated to create a piecewise linear expression manifold, or a pattern of facial movements. In an embodiment this pre-computed facial geometry is combined in the model to create real time facial animation with realistic deformation and skin motion. However other methods may be developed to create pre-computed geometries or process geometries on the fly. In an embodiment of the invention the graphical output may be used to drive a robot face or similar physical representation. Alongside the physical representation of a face the graphical output may be able to display further details about the graphical output such as the tension or stretch or stress.

Learning Elements

The model also allows for learning and/or episodic memory elements. These elements may be implemented in the form of modules which store a set of data values or weights. The weights may be related to a neural network. In a an embodiment at least some of the weights are synapse-like weights. The weights may change or adapt to a change in the environment or inputs of a model. For instance they could react to dopamine levels, where a higher level may indicate a more plastic state. In this way the neural network of the model may adjust automatically and the outcomes may alter with time. The dynamics of social learning are key in developing realistic interaction, as a party or user interacting with the baby would expect the baby to change its response on provision of positive or negative reinforcing feedback. The learning modules may form a part of a computation portion of a module and may also be shown in graphical form as described above if required.

The learning modules may be associate learning elements or association engines or modules. For example the model may be trained so that it learns by reacting to earlier events. A positive reinforcement cycle may occur when a reaction with a user appears to show a successful outcome, the successful outcome encourages the reinforcement of the weights or pathways through the system. An association between two variables, modules, or inputs and outputs indicates a relationship forming between them wherein a change in a first causes, directly or indirectly the latter one to change. In some cases multiple associations may be formed to or from the same module/variable or stimulus. This means that the next time the same event occurs it will be preferential in a similar way. A second example may use a negative example where the weights are changed based on a negative response to some stimuli. Over a period of interactions this allows a preferential set of weights to be built in an association engine and for the reactions of the model to change and adapt. In some embodiments the association between a stimuli and weights may be indirect, filtered or effected by a path through the system or other learning modules. In some case, particularly when focussed on biological systems, the learning process may be suitably indirect that the full effect of the change is observable only in the behaviour of the virtual object. I.e. it is not easy to ascertain how particular weights have changed to cause an effect.

In some embodiments the learning modules may be dependent on the internal activity, or internal sources or stimulus. This allows the system to create an internal world rather than be dependent solely on external stimuli. For example, internal homeostatic imbalance e.g. tiredness could affect behaviour, without being related to or associated with an external input. Or behaviour may be affected by history/memory which are internally generated, so would be an indirect internal response. In further embodiments the neural networks, analogous to a weather system, may be constantly evolving in their activity, as some of them exhibit chaotic behaviour, depending in a nonlinear way on their past state. In one embodiment the system includes neural networks designed as central pattern generators which generate certain behavioural actions even in isolation from external stimuli. For example babbling may be created by a central pattern generator (CPG) operating rhythmically and this may provide a basis for a learning module. In other embodiments the learning networks may form associations between internal stimuli, the feedback loop having only an indirect external output or being primarily focussed on changes between the interactions between modules.

The CPG's are not known to have been used in digital animation and provide a way of creating time series of activity (potentially cyclic or rhythmic). This activity can be a core feature of the system, being biologically plausible and allowing the neural networks or computational elements of modules to generate patterns. For example behaviours like crying or laughing or breathing are driven by central pattern generators. The central pattern generators may be constructed or coded by fitting animations to Recurrent Neural Networks (RNNs) using a fitting algorithm. On activation of the RNN (by for instance an activation signal) a pattern may be generated. Th generated patterns introduce variability into the animation, so the animation doesn't exactly repeat (as it is created by, or has as a part, a potentially chaotic system), but has a similar repetition. For instance this may provide variability in response based on similar inputs, which we associate with some biological behaviour.

In some embodiments it may be desirable to fix the associations of a module. For instance a model may be trained so as to act in a particular way and this may not need to be changed. Alternatively the ability of the system to change or adapt may change with time or neurobehavioural elements. In this case the association engine or module may be referred to as fixed or a pattern module. A pattern module may be used for graphical elements including pre-built appearances including facial expressions. There may be a plasticity variable which can control the amount of change possible to an association module or learning module. This may function by limiting the possible change in weights for any time step. The plasticity of a module allows the speed of change to be adjusted and may be optimized to trade-off between retention of memory and pick-up of new memory. In some cases weights in a single module may have varying plasticity. The plasticity may be influenced by feedback as well as external modulatory signals such as from neurotransmitters.

For example the association module may be used to teach a module to play a simple game such as pong. The model may have stimulus which is the visual input of a pong screen, and output the position of the paddle by moving its eyes. A reinforcement means may be provided through an increase in a neurotransmitter such as dopamine. When the model successfully hits the ball with a paddle through motor babbling, the model receives more dopamine and the neurobehavioural system may associate this with the tracking of the ball/paddle and reinforce the association modules relating to this.

Example Models

Figure 5:
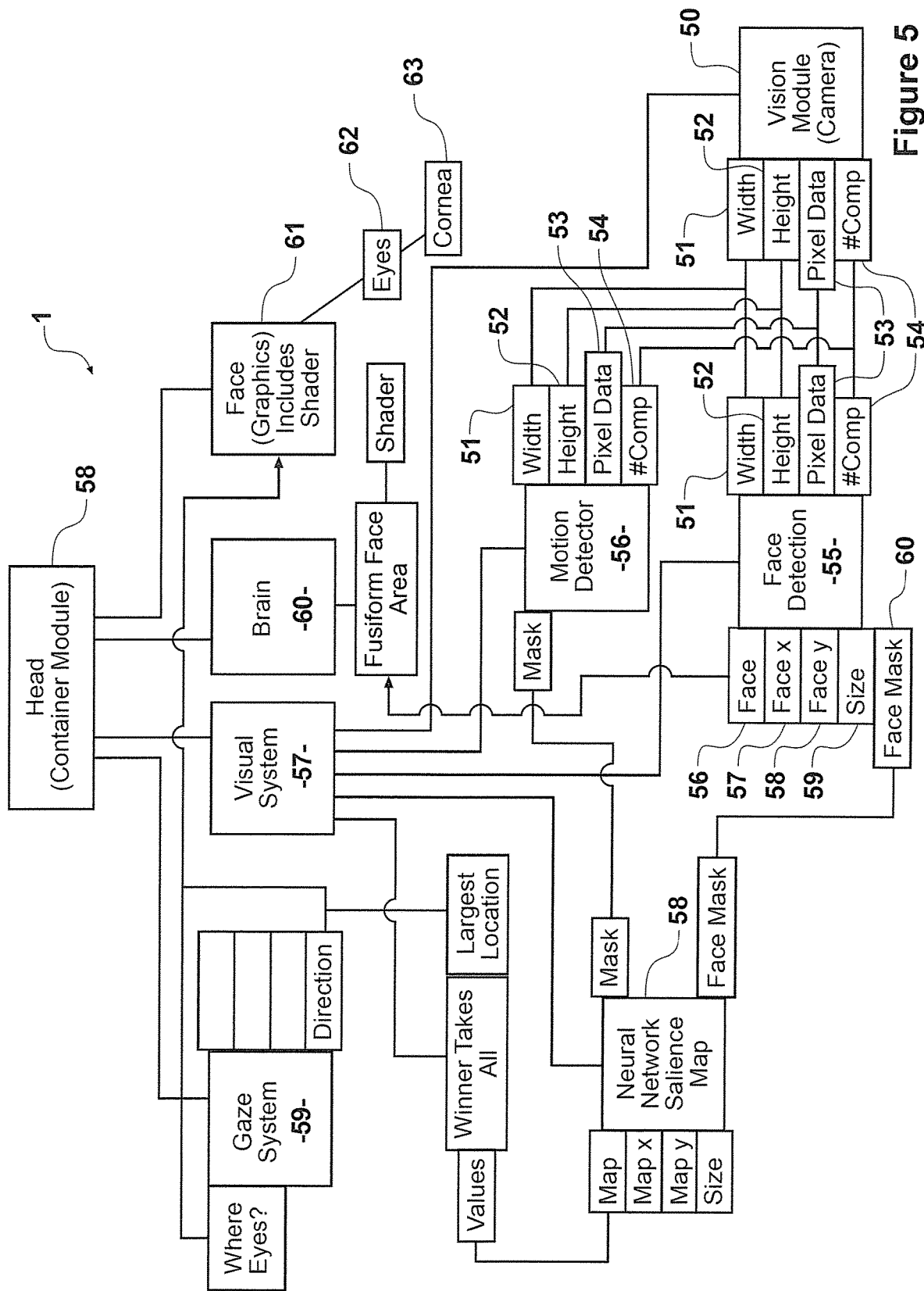
FIG. 5: Shows an embodiment of the invention where a plurality of different modules are linked.
Figure 6:
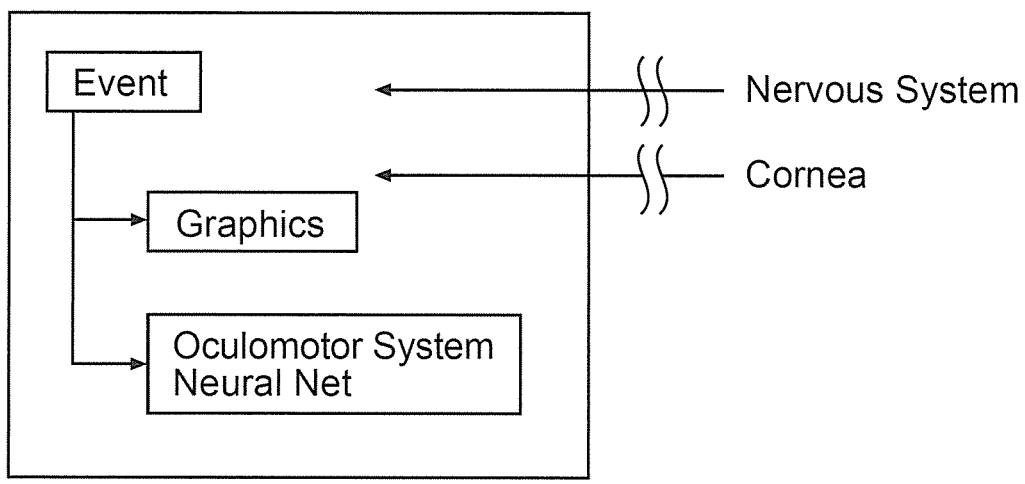
FIG. 6: Shows an embodiment of an eye-blink module having links to graphical and computational systems.

Referring now to FIG. 6 the flexibility of the model is shown through an implementation of an eye blink. This feature could be incorporated as part of the face structure of the face 61, eyes 62 and cornea 63 described and shown in FIG. 5. The blinking of the eye is coordinated by the oculomotor system so that blinks tend to occur during saccades. In one embodiment the system may be modelled by a module with an appropriate neural network. In an animated model the eye-blink system must also have a graphical element—linked to the eyelid and the muscles around the eye. These connections are made straightforward because of the structured and combined nature of the eye system and the computational data being added. However the eye also has complicated relationships with other areas of the brain. For example eye blinking rate may be affected by dopaminergic activity. The structure of the model allows for this completely different and complicated system to provide an input into the eye-blink system, without alteration to the eye system. If there was some form of feedback to the nervous system this could also be simply connected. The ability to interconnect the two systems may rely on the hierarchical structure of the model and the separate nature of each module.

In a further example we may consider what happens when a change in environment occurs, for instance when a change occurs in the visual field of a model this is detected by a camera. The camera output is mapped to the simulated retina which detects luminance change and maps to activity on the superior colliculus which resolves competing inputs and directs the oculomotor system (comprised of multiple nuclei) to generate saccadic eye motion which is sent to the animation system. Unexpected stimuli cause dopamine release via the tectonigral pathway. The eyes foveate on the stimuli if novel or rewarding dopamine is released which affects the Basal Ganglia, modifying current motor activity and future response through hebbian plasticity. The amygdala associates the current emotional state with the stimuli, and may trigger hormone release in the hypothalamus and activation of brainstem motor circuits driving facial muscles which produce animation by activating pre-computed biomechanically simulated deformations. The response and plasticity of the subsystems are affected by the levels of different neuromodulators and hormones, which also influence the affective state. Because the behaviour of the model is affected by its history as well as external events animation results from complex nonlinear system dynamics, self-regulated through parametric physiological constraints. This describes a particular set of reactions based on a visual environmental change and biological understanding of the neural systems. However it should be understood that the complexity may not only manifest through the model described and the model may be varied to incorporate or remove sections or features as desired.

Applications

To provide examples of possible uses of the described system and method applications involving a game environment and an advertising environment are discussed briefly. However, the invention may not only be limited to these embodiments. In a gaming environment a user may control an animated character or virtual object which interacts with other in-game characters. In many games these characters are very simply or zombie-like in their actions.

These in-game characters may be implemented using an embodiment of the invention, helping to overcome the computer-like or robot-like nature or character of many in-game characters. The computer-like nature can include having constant interactions or having interactions that do not change.

Characters based on neurobehavioural models can have abroad range of skills or lack of skills while representing very realistic interactions. Furthermore a game developer can adjust the characters, or allow characters to learn, in a straightforward manner so as to provide a wide range of different character types depending on application. For instance characters could be modelled to be more or less receptive to a neurotransmitter or other variable (neuromodulation), such as oxytocin or dopamine, or have slower reaction times depending on the desired usage of that character. The interconnected graphics portion of the model make these changes clear and convincing, for instance a character who is upset may appear upset because of the interaction, and this upset facial expression may be realistic rather and/or smoothly changing based on the interaction between the user and the character. This may provide further advantages because it enables the creation of a plurality of characters with different interaction abilities to create a complex world.

A character with learning aspects or modules allows an interaction between the character and user to be remembered and the neurobehavioural model will be realistic when the characters meet again. For instance a character to which a user is kind may have a learning module that remembers this and interacts positively at the next interaction. In this way interactions between a user and a character will be both realistic graphically and will develop over a series of interactions in a realistic or interesting way.

In a further example the system or method may be applied to or associated with an advertising means, display screen or webpage. In this example the model may be interacting with a user to present an idea or product. The model may have a stimulus which is visual input of the users face and provide an animated visual output which the user can see. The user's interaction is not one-sided but interactive, where a different response of the user to some element of information may cause the model to process the response and make a choice about what to present next or how to present this information. At the same time the graphical or visual element of the model presents a realistic and emotive facial expression so as to improve connection with a user. Because the model combines the graphical and processing elements it can build a strong connection which, at least in part, may bridge the uncanny valley effects. The neurobehavioural information of the model may also be used to judge the effectiveness of the advertising. Again the processing or graphics of the model can be adapted so as to provide the desired service. For instance a drive-through restaurant may have a model taking orders which has human-like qualities so as to overcome any anti-computer bias but may also be represented by a graphical output similar to a character associated with the restaurant.

In a further example the system may be used in a human interaction environment. Airport check-in is often personnel intensive and requires a high through-put of passengers. However, limited success has been had using avatars or digital entities to interface with passengers. This is partially due to the lack of interactivity of avatars. However a neurobehavioural based avatar may be capable of changing behaviour based on passenger response to provide a better service. This may be achieved by monitoring the passenger visually or by reviewing answers provided by the passenger. The model described provides a system capable of sensing and changing behaviour as well as being expandable or adaptable for different situations or passenger interaction points.

System Operation

The system may run on a general purpose computer. The architecture of the system may comprise a plurality of levels or data structures. In one embodiment there are a plurality of levels in the model architecture. The levels may comprise Programming defining each module type and function;

Structure combining and ordering a plurality of modules; and

Structure providing linkages and communication between modules

The separation of the model into a hierarchy comprising modules at different levels of detail allows broad interconnecting between modules in the model because there is clear separation between modules but the overall structure provides a means of connecting them. For instance if a connection is to be made to the eye, the eye may be separate from the face or nose allowing new connections to be made to the eye without affecting the remaining model. The organisational structure of the model also allows the eye to be easily found and the link created. In some embodiments connections may be made between substantially any of the variables in the model. This may allow graphics to be interfaced with neural models and the formation of complex animated systems. In some embodiments the described structure provides an ability to create complex animations in a straightforward manner because it separates and distinguishes design levels and skills.

This allows a first user to create the modules; a second user to structure and group the models appropriately and a third user to make connections and data flows between modules. The connections may be seen as a way of describing the interrelation between modules, or the variables of module or the system. In some instances a single user may perform each of the tasks, but may do so in a separated manner so as one section may be updated without affecting the system or requiring large restructuring or reorganisation of the system. In this way a model may be constructed from a library or collection of modules or module templates. This allows the separation of the modelling into a coding/preparation portion and an assembly (of modules/module templates) and linking (of connectors) portion. The assembly portion does not necessarily require the understanding or skillset of the programming portion and can be performed in a straightforward manner by one skilled in the structure of the model. The module templates may be broad description of modules without clearly defined functionality. These may be refined by the addition of functionality or graphics, for instance from known scientific models to form modules. The library may comprise a mixture of modules and module templates depending on the proposed method of construction. The library may include a set of modules capable of creating a behavioural structure or neurobehavioural structure.

In an embodiment the operator or user selects modules to include in the model or network, selects connections between modules and adjusts parameters associated with the modules and the relative position of modules in the required structure. The operator then observes the digital entity or avatar displayed at the screen and adjusts combinations of the module selection, position, parameters and connection of the modules which affects the characteristics of the response of the avatar controlled by the model. For instance the character of the avatar could be affected or configured by changing the topology or layout of the required structure. New modules could be added, module sections replicated or structure portions (e.g. tree branches) removed. The changes in connections between modules or system would also affect character—for instance if a neurotransmitter was no longer transmitted between modules or the transmission was less effective. The amount of configuration required would depend on the level of differentiation, or the importance of the differentiation between the behaviour of avatars or virtual objects.

In an embodiment the extra information processing capability is based on the precise timing of different signals is an adjustable parameter to the system. Thus the outcome of the model may be dependent on how information is connected through the model. In an embodiment the relative position of the modules may be a parameter. This enables movement of the modules to cause location-reference data to be adjusted. In an embodiment a purely temporal reference frame is used in place of positional reference frame.

The modules should first, or before use, be adapted to be recognised by the model. The structure or hierarchy of the plurality of modules can then be created. Each point or node on the structure may be linked to other nodes and may contain a link or pointer to a module from the library. The nodes may occur with and be referred to as modules. The module computational element or code may be contained directly in a module at the node. After the required structure or dependency tree is built connections can be made between the nodes on the structure. These connections may be viewed as a web over the branches of a tree. The connections enable the basic dependency to be transformed into a complex and developing system by linking the points (using modules and connections) in substantially non-limited ways. The connections may be made without requiring the structure to be recompiled. In this way the model may be updated, tested or optimised in real-time and with fast responses. The dependency tree may be referred to as a means of describing the system and the relationships between modules may be created through a programming language.

A feature of the model is that modules may represent the system at different levels of detail. For instance, based on the hierarchical structure and design of the model a simple basic system may be implemented to provide the basic functions of a model. The portion or branch of the structure associated with a feature of interest can be highly developed, to a high level of detail (low level system) with many associated neurons or computation complexity, while the remaining model operates at a relatively low level of detail (high level system). The level of detail required or used may be adapted dependent on the situation or processing power available. This may be particularly relevant for models where it is difficult to anticipate the amount of detail required. Where previous models required the level of detail to be adjusted or chosen before building the model the flexibility of this system may allow for continuous manipulation of the level of detail.

Referring now to FIG. 5 a schematic of a portion of an example model 1 is shown. The schematic demonstrates the links, structure and interaction between the graphical, computational and biological nature of the model. Beginning at the bottom of the figure a vision module 50 is shown. The vision module may be implemented using a camera or other optical sensor, or a stand-in device. The module produces outputs including a pixel array 53, with a width 51 and height 52 and a composition number 54 (to distinguish between RGB and grayscale). These outputs may be connected to other parts of the module. For instance, they may become inputs to a face detection module 55. The face detection module 55 may be programmed, or otherwise adapted, to detect face structures from an image, producing outputs describing the face 56, the face's coordinate position 57, 58, size 59 and a mask of the image 60. Similarly the outputs from the vision module 50 could be connected to a motion detector 56 as shown, or a range of other modules as needed.

A feature of the described system is that a module, such as the vision module 50, may have any given structure inside it. For example, the camera module may first be implemented as a black box for testing purposes, providing a known or constant input. When required an appropriate imaging system or camera could be inserted into the module. This process requires that a wrapper or identifying structure is organised, coded or written around the input device (or model) so as to form a module. The wrapper or module definer tells the model how to interact with the module. Applying the wrapper may require specifying the inputs and outputs of the module and a time step action. After the module is prepared introducing the module into the model requires linking the module to a section of the model hierarchy and linking the inputs and/or outputs (as defined by the wrapper) to other modules. The wrapper or model definition introduces or defines new modules containing different systems or model types into the system or model in a way that the models remain distinct but are relatable and connectable. The features of a module are not limited by the model it is placed in. The model has the ability to incorporate a plurality of different modules with different kinetics or operations or neurons and combine them in a simple way. The available modules may form a library or selection list in which a plurality of premade modules may be incorporated into the model multiple times.

Module types may refer to specific module instances but is preferably referring to the central or overall function of the module. For example a module type may be graphical where it has a primary or sole function of displaying an input variable or of displaying a graphic using the instructions of the input variable. Similarly an animation module displays a graphical element but also allows movement of the graphical element. A module type may be computational where is has a primary or sole function of processing the inputs into outputs. There may be different types or sub-types of modules such as computational models. For instance a module may provide a relatively simple computation such as a 'winner takes all module' of FIG. 5, or more complicated models such as neurobehavioural models or bio-mimicry models. These may be referred to a simple computation modules and scientific computation modules respectively or other terms may be used to differentiate between sub-types of modules. For example a neuron type module will comprise one or more neurons between the inputs and outputs. An interface module may receive inputs from external sources or provide outputs to external sources, for instance a camera module would be designed as an input interface. A module may be a container or structure module with limited or no function but creating structure or organisation for other modules. A learning module may have a memory or storage elements to provide changing behaviour. A module type may also refer to the level of detail of the module, for instance high- or low-level modules.

Vision module 50, face detection 55 and motion detector 56 may be organised hierarchically below a visual systems module 57. The visual system module 57 may be a container or may also comprise or contain operational code or instructions. The visual system may also link to processing modules. FIG. 5 demonstrates a neural network module, acting as a salience map 58. The salience map module 58 may take inputs from the face and motion detectors and produce a series of outputs relating to out the important features of the vision image. This may be achieved by any of the commonly known means. In some embodiments a biological type neural network may be used or a model based on biological systems. The output of the salience map 58 may then be processed, for instance by a 'winner takes all' module which isolates the strongest feature. As is shown in FIG. 5 the structure of the model has allowed all the building blocks of the visual system to be contained or held together, positioned or related in an organised manner. However, the system also allows connections between modules whether those modules are in the same structure or in an unrelated structure or a different container module.

The visual system module 57 is shown in FIG. 5 contained in the head module 58. The head module also contains a gaze system module 59, a brain module 60 and a face module 61. The selection of modules possible is not limited to those shown. The modules may each comprise some portion of the systems required to build a model of the head. For instance the gaze system module 59 is in the head module and provides instructions for which way the eyes are looking. This may require, at least, inputs from the visual system 57, the face system 61 and outputs to the face 61. However further connections may be made to the brain or module 60 or another module such as the eyes 62 or pupils (not shown). The connections between modules, either at the container level or directly to sub-modules provide great flexibility in the operation of the model. In a sense, any feature is represented as one or more modules whose inputs and/or outputs may be connected to any other input or output by a connector. The use of a modular system allows a layout or organisation of the components of the model, providing both a visible form of the model and allowing configuration and/or reconfiguration of the model and its neural circuits.

In an embodiment of the invention the graphical elements are integral to the model. This overcomes problems associated with maintaining a complex biological model for a brain and the animation required for realistic movement separately. In the embodiment shown in FIG. 5 the face module 61 contains the graphics and animation for a modelled face. The face module and child modules such as eyes 62 and cornea 63 are contained in the structure and hierarchy of the module alongside the processing and calculating modules discussed previously. In further embodiments there may be further relationships between modules. For instance a connection may be formed between the eyes module 62 and the vision module 50 so as that the camera looks in the direction of the eyes. The combination of graphic elements with the computational elements is complex as each system is inherently complex involving many interconnections. However the use of the same or closely corresponding structures for each system provides simplicity and an understandable system. This is, in part, due to the avoidance of redundancy between the different systems and the clarity of the resulting model to a user.

The hierarchical relationship of and between the graphical elements, the sensor elements and the processing/computational elements provides a structure in which a complex system can be built and understood. Instead of requiring a complex structure to be carefully planned and optimised the model may be built up and improved in a piecewise manner. For instance a modeller/user could have begun by defining the structure of the face and its components. After building the face 61, eyes 62 and cornea 63 the appropriate graphics could be included in the module hierarchy. Then, perhaps based on a biological model, a simple feedback loop could be programmed from a visual module 50 to direct the eyes. Because of the hierarchical structure described the movement of the eyes is dependent on the movement of the head, leading to a consistent and realistic movement. The effect may be passed through the hierarchy using a transformation instruction contained in each module. The eye movement may also be linked to a visual input which identifies interesting environmental features. This input may, through the link or connection, provide a directional input to the eye. The eye system may take the combination of these inputs and act so as to match the graphical and computational inputs. New features can be subsumed into the existing model by additional modules and connections being added. This allows a backbone of modules to be created and then additional complexity of graphical models to be added as appropriate and without having to rebuild the model from the beginning.

In an embodiment the model may be understood by considering information flow from the inputs (for example audial/visual external inputs) to the outputs. The required structure provides a first flow of information through the model. In particular the required structure provides a layout or configuration of the modules so that information is shared to modules that are dependent on other modules. This configuration provides information flow that is suited to understand systems or physical structure where dependencies are clear and replication or repetition of portions of the structure is desirable. A second information flow is provided by the connections between module variables. This information flow is built, preferably in a web-like structure over the required structure so as to define links between modules that are not dependent on the required structure.

For example these connections are particularly suited to neurotransmitters/neuromodulators or similar which have wide ranging effects on a plurality of modules across the model. The connection or links also allow for modification of the connections or new connections to be tested. As these are at least partially independent from the required structure considerable variation is possible to the connections while the required structure ensures the model remains consistent as a whole. The relative complexity of the required structure and the connections can be varied. For instance in a complicated model it may be desirable to use the required structure as a substantial framework with connections making links between it. However, for greater flexibility a simple required structure could be used with a greater number of connections then made to transfer information around the structure.

The required structure may demonstrate a clear relationship or dependency between two modules. For example the required structure may represent the physical relationship of a series of modules (e.g. head, face, eyes, cornea and pupil). While in a model having a limited required structure this information may be transferred by connections this makes it more difficult and less efficient to represent the portions of the model visually and for a user to modify the configuration of the module. The connections must transfer more data between the modules and the connections must be carefully constructed to ensure that important or necessary relationships are not removed. The connections then link variables between modules without establishing a dependency between the modules themselves.

In some embodiments the required structure may form an important part of the systems operation. Preferably the operation is time-stepped. The time-stepping should occur at a rate fast enough that the animation or output appears fluid. A frame-rate of 40 frames per second may be perceived as fluid and requires a new frame every 25 ms. Given a computation time of 1.5-2.5 ms this allows approximately 10 computational time-steps before a redraw is required—although the graphical output may be redrawn more or less frequently if desired and the computational time may change dependent on system parameters and model complexity. In an embodiment the main operation may involve each module taking a time step. In this time step the module computation elements may be updated. Typically the graphical element does not have any change in a time-step. Each connector then updates with the new variables and transports these to these variables to the connected modules. Then, preferably by working from the top of the required structure to the bottom, following the transformation instructions the model can be redrawn. As described above the time step and connector updates can be repeated multiple times before a redraw. Similarly some modules may have breaks or holds so that they do not update as frequently as the rest of the model.

The model may be implemented by having a first library or collection, or list which includes vary broad template modules or module types such as neuron modules, association modules etc. This library may be used to build a second library or set of modules which implement or describe a particular method or model inside the module template. A description of the links between each of, or each instantiation of (as modules are preferably usable multiple times in one model), the modules is then written, preferably in BL. This description explains how the modules are connected and which modules have graphical outputs. A further description or code may be used to provide further structure or links between modules. In a preferred embodiment at least one of the descriptions are based on a file-structure, where the modules may be arranged in the file structure to establish an arrangement, required structure or hierarchy. Such a system provides a high degree of flexibility in changing the model and separates the complexity of creating single models and the complexity of combining a range of modules appropriately.

Neurobehavioural Model of the Cortex

Figure 9:
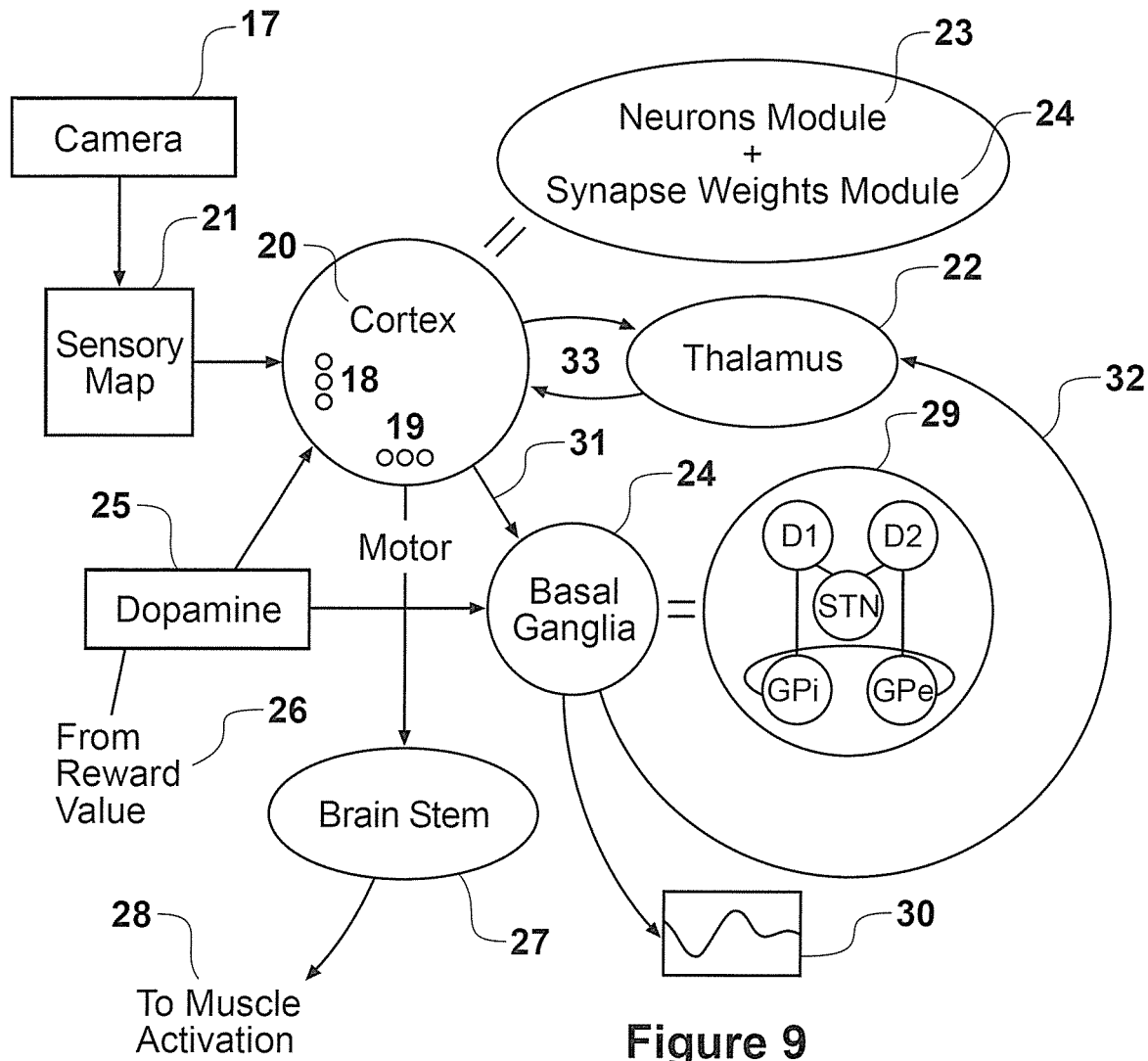
FIG. 9: Shows a schematic view of an embodiment of the system surrounding the cortex.

Referring now to FIG. 9 a schematic is shown of the cortex 20 and a selection of connections to and between related modules. This may be referred to as the cortico-thalami-basal ganglia-loop. The cortex module may have neurons module/s 23 which integrate activity of incoming modules and/or synapse weights modules 24 or association modules which can do plasticity or change effects over time. An input to the cortex 20 comes from a sensory map 21. The sensory map may be used to process the data received from an external stimulus such as a camera 17. The sensory map 21 functions as a translation form the pixels of the stimulus to neurons which may be inputted into the cortex.

The cortex may have feedback connections 33 with other modules such as the thalamus 22. The feedback loops can be used to provide a means of integrating sensory perception into the cortex. A positive feedback loop may help associate a visual event or stimuli with an action. The cortex is also connected to the basal ganglia. The basal ganglia 29 may have a plurality of related or sub-modules which include neuron modules and synapse weights modules and may provide feedback to the cortex or to the cortex via the thalamus. Although only single connections 31, 32 are shown to the basal ganglia multiple connections may be made and further connections may link to shown or non-shown modules. The basal ganglia 29 itself, or modules connected to the path may modulate the feedback between the cortex and thalamus. That is the intermediate module with neural functionality may increase the complexity or adaptability of the structure. A neurotransmitter/neuromodulator 25 such as dopamine or oxytocin may be used to effect the operation of the structure. This may be implemented as a connection from another portion of the module, or external stimuli. In a preferred embodiment a neurotransmitter such as dopamine would link from a reward value 26, where a high reward value would be positive and release more dopamine.

The cortex may also be linked to an output means, in the shown diagram this is a motor output means to muscle activation 28 which is connected through a brainstem module 27. The brainstem may contain pattern generators or recurrent neural network modules which have pre-set or blend-able pre-set muscle activations 28. Output means may also be used to display the operation of any of the modules in the model. These are separate from the display of the animation or muscle activation and allow changes in variables, synapse weights or other features of the model to be displayed. As discussed herein this may be achieved through each module having a functional and graphical component, the graphical component being toggled between visible and invisible as required. Alternatively graphical modules may be used to improve the presentation or computation associated with these outputs. For example a scrolling plot 30 may be linked to the basal ganglia 29 to monitor the changing nature of any one or more of the variables. Because a separate module is used more computation regarding the variables plotted, or the presentation of that plot may be possible. In another graphical output, not shown, the operation or change of the synapse weights may be modelled or the transmission between modules or neurons inside modules could be visualised.

Model of Eye Movement

Figure 10:
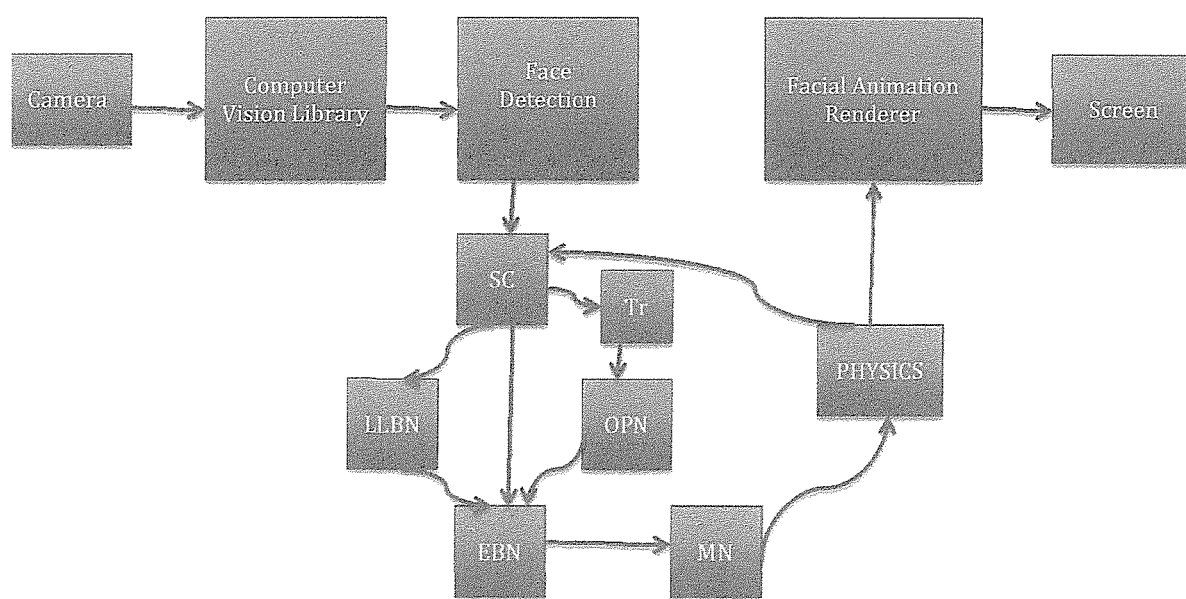
FIG. 10: Shows a system for controlling an avatar in response to data defining stimulus.

FIG. 10 shows a system which controls eye movement of an avatar displayed at a screen and which receives stimulus for the avatar at a camera. The camera communicates with a computer vision library which communicates with a face detection unit. The network has the following modules: SC: Superior Colliculus; Tr: Trigger Neuron; EBN: Excitatory Burst Neuron; LLBN: Long Lead Burst Neuron; OPN: OmniPause Neuron; MN: Oculomotor Neuron; Physics: Physics based Dynamic Contraints. The modules interact to forma biological type system based on the connections between them.

Figure 11:
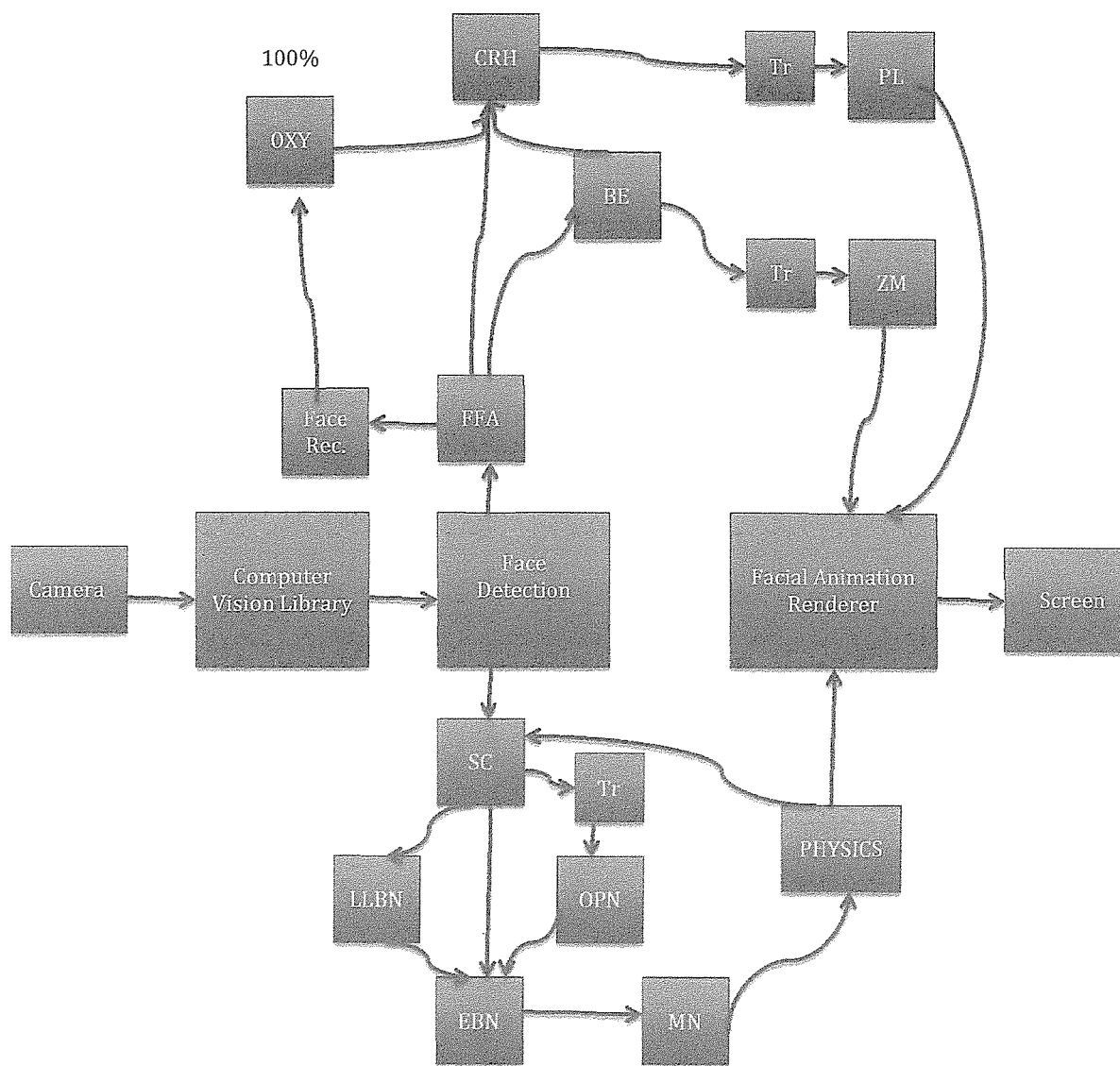
FIG. 11: Shows a system similar to FIG. 10 but with the addition to the network of example emotional reaction modules

FIG. 11 shows an expanded system or model having example emotional reaction modules which react to the presence of faces (FFA) and model levels of Corticotrophin Releasing Factor (CRH), B-Endorphin (BE) and Oxytocin PHYSIC (OXY). The OXY parameter is a neurotransmitter which is able to change or affect the performance or operation of modules, such as the CRH. For instance a higher OXY value allows a greater inhibition of CRH, which lowers stress and the chance of triggering activation of distress behavioural circuit which activates PL. The additional modules are: Face Rec. Face Recognition module; CRH (Corticotrophin Releasing Hormone); BE (Bete Endorphin); OXY (Oxytocin); FFA (fusiform Face area); ZM Zygomatic Major Muscle; and PL Platysmus Muscle.

Figure 12:
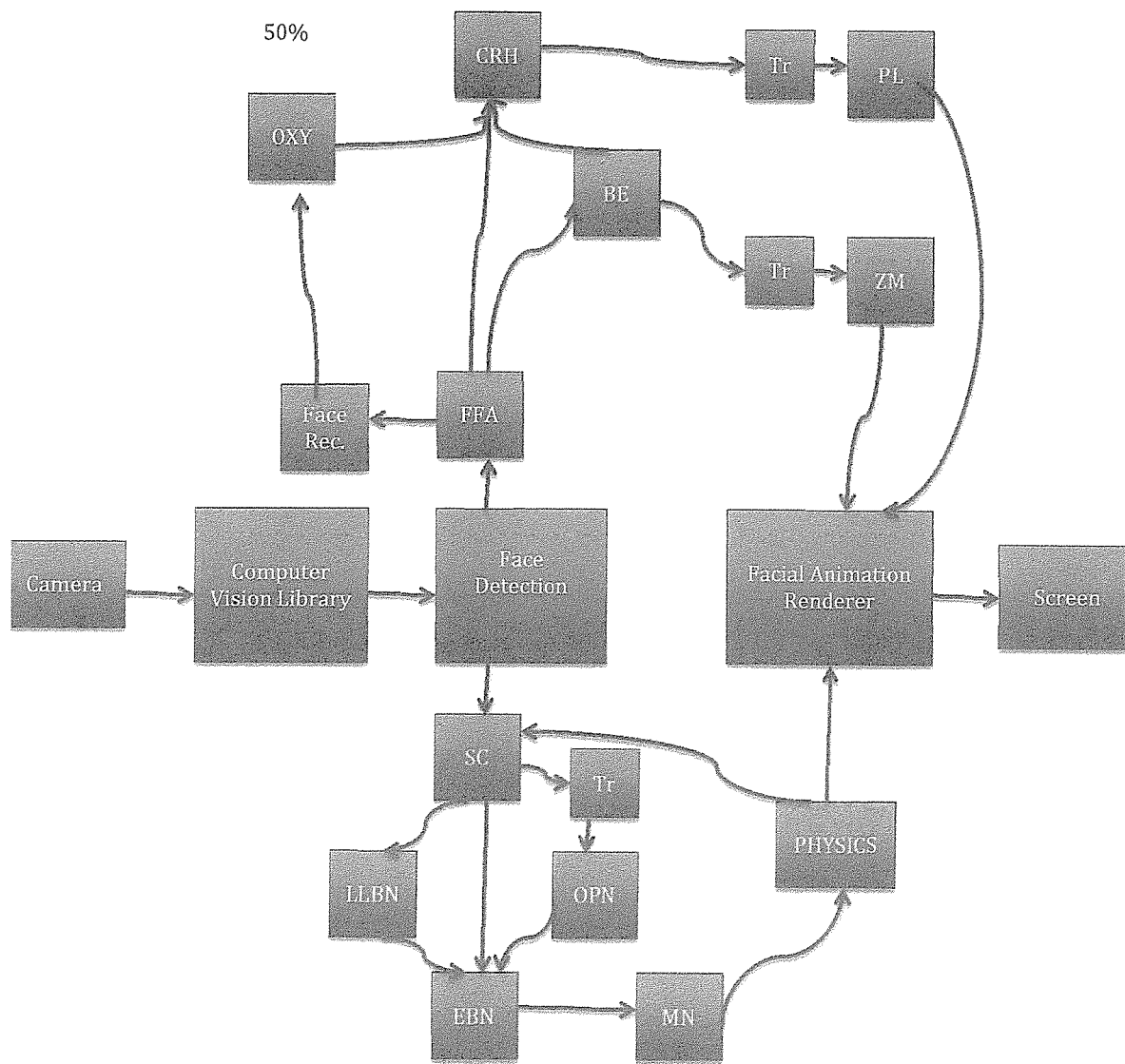
FIG. 12: Shows the system of FIG. 11 in which a parameter which defines an aspect of the functional operation of a module is adjusted.

The adjustment of a parameter, for instance the level of a neurotransmitter such as oxytocin is shown in FIG. 12. The parameter may define an aspect of the functional operation of a module. In this case the responses of the digital entity or avatar and/or characteristic responses of the digital entity are adjusted by adjustment of a parameter associated with a functional module. In this way the characteristics may be changed in an overall sense instead of requiring a series of changes in each module. For instance in some embodiments the adjustment may propagate, such as radially from a module or point in the space in which the network is defined or linearly across the network or along connections or through the required structure. In the case of the network of FIG. 12 the OXY parameter is reduced to 50%. If this reflects the biological oxytocin system the system dynamics are modified and the system becomes more prone to effects of stress, reducing delay in activation of distress circuits activating the platysmus muscle.

Figure 13:
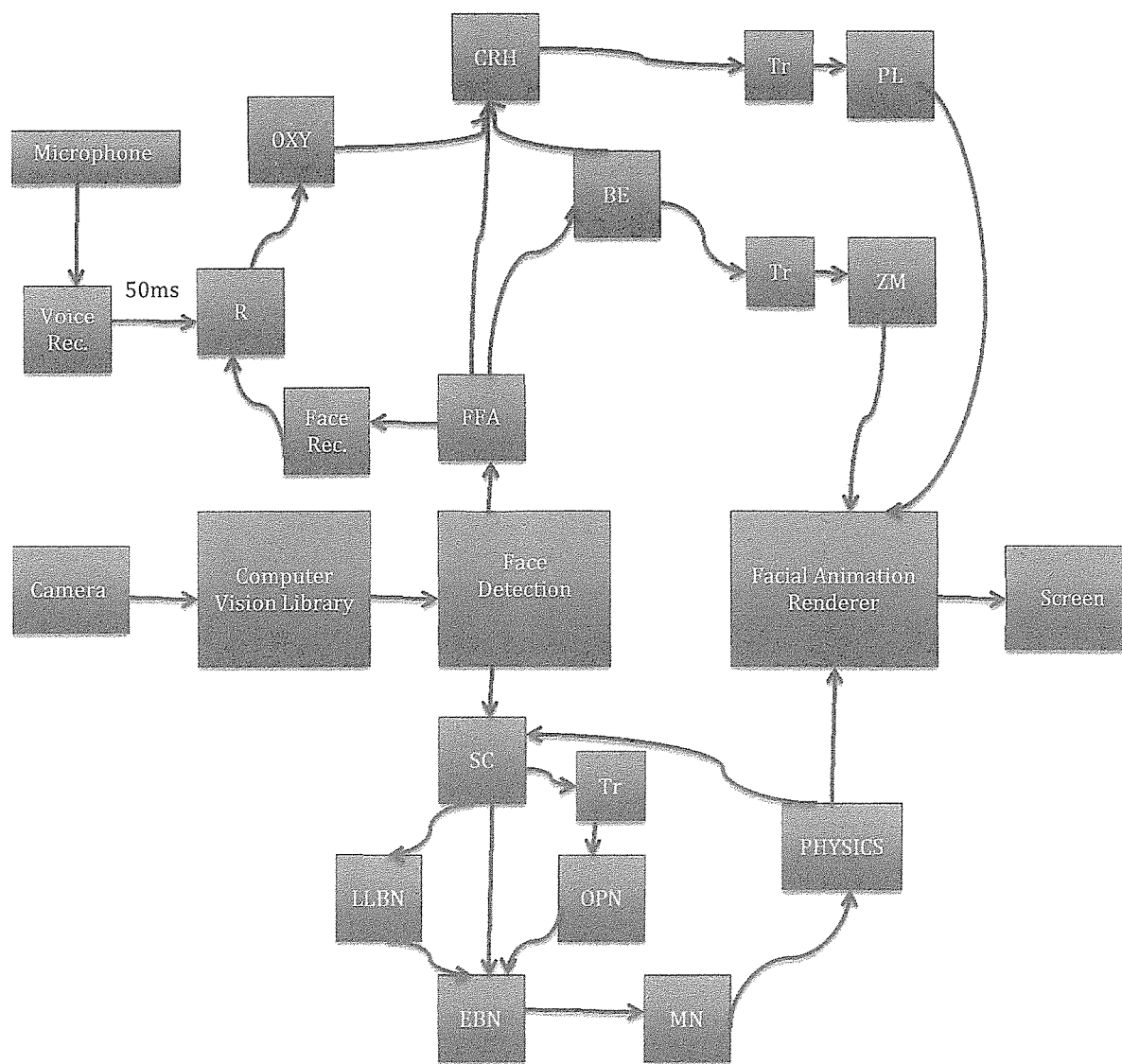
FIGS. 13 and 14: Show a system similar to the system of FIG. 12 in which the network has an additional Voice Recognition Module for multimodal recognition of face and voice.
Figure 14:
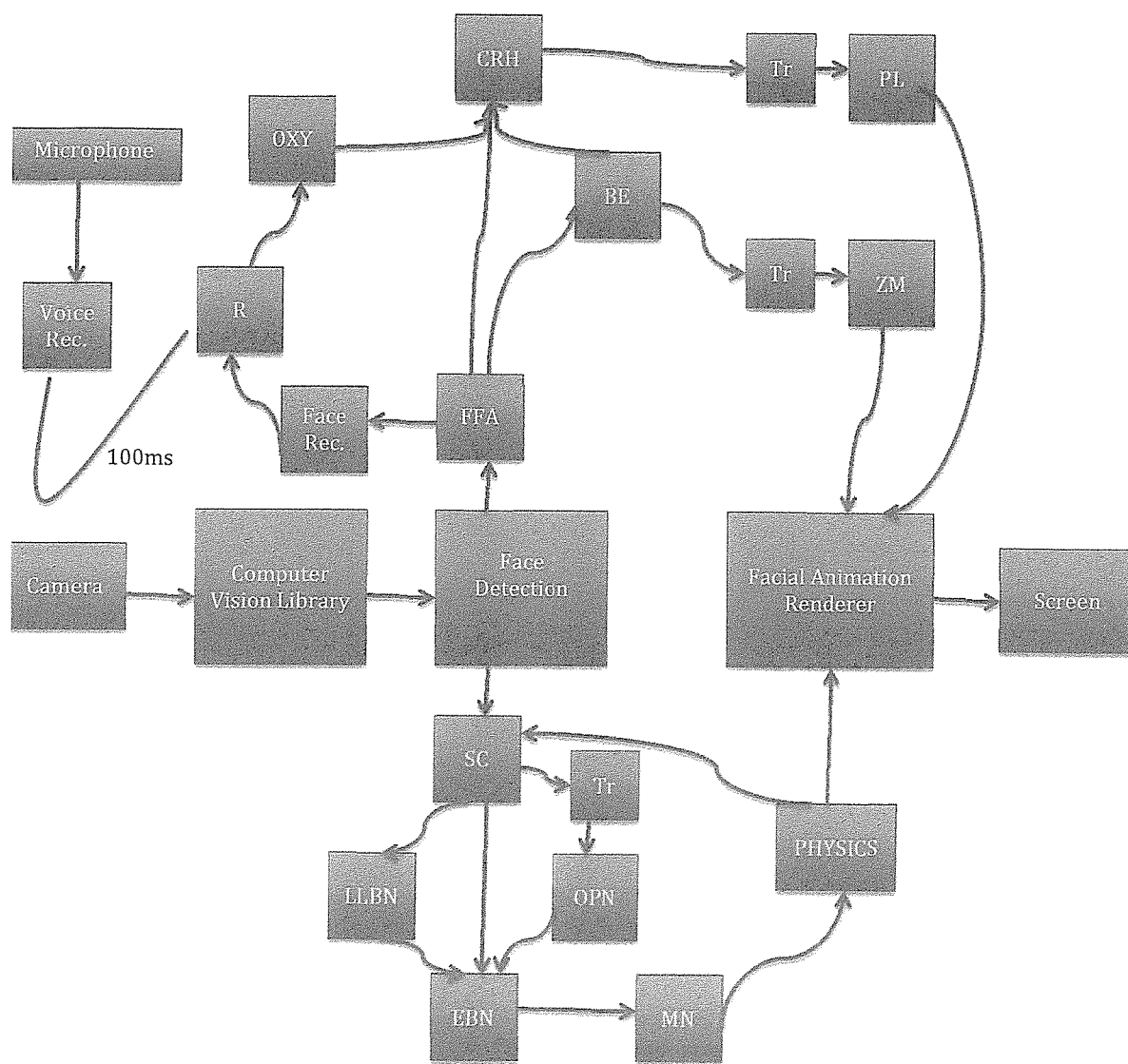

FIG. 13 includes an additional external input or stimuli provided by a microphone and voice recognition module for multimodal recognition of face and voice. The multimodal recogniser, R, fires if face and voice recognition is simultaneous. The time both signals arrive at R may depend on the required structure or connections or the different processing pathways. In this example a time delay of 50 ms in a module or connection ensures appropriate signalling times. In an alternative embodiment a delay may be used to ensure that the signals reach a module at the same, or an appropriate time step. FIG. 14 adjusts the delay in the voice recognition connection, which affects the relative timing of arrival of voice and face recognition signals. In this example an extra delay has been added compared to the network of FIG. 13.

Development of Eye Movement Model

Figure 15:
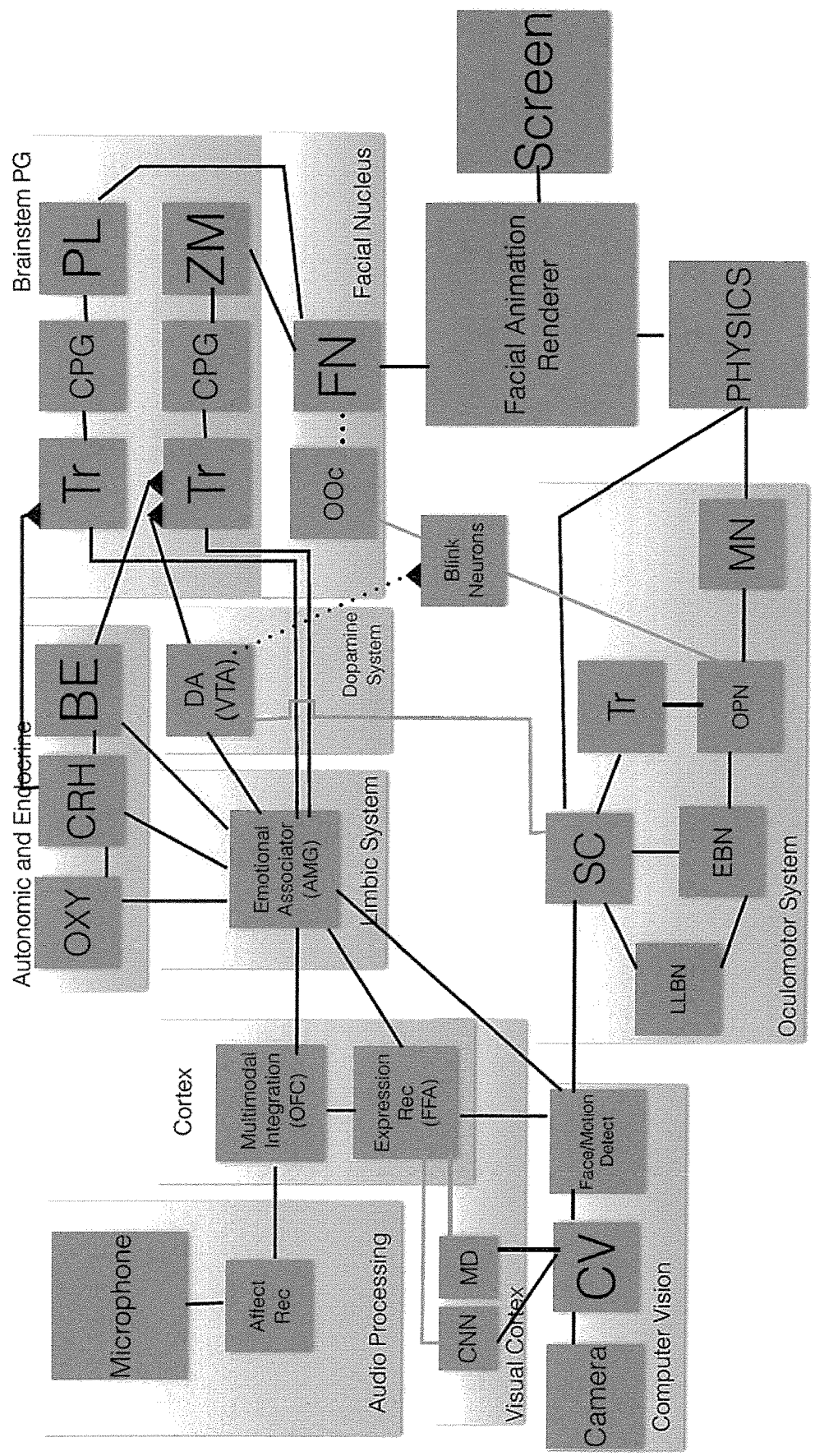
FIG. 15: Shows a model of a neurobehavioural system showing how different neural systems and computational elements can be combined.

FIG. 15 shows a schematic of a model taking visual/audial inputs and producing an output animation. The embodiment of FIG. 15 shows that a complex biological based architecture can be constructed with a high level of model sophistication and the ability to increase functionality further if or when required. A portion of the required structure is shown in which module groups are formed, these module groups may be turned into modules in some embodiments. In a full model the required structure may be more extensive fitting each of the module groups into a hierarchy or other structure. The structure of the model allows the interconnection between the modules to be incorporated after they are built, providing additional complexity as the model develops. Although this example describes a facial recognition system the model is not limited to this and the facial recognition system may be only a portion of a complete model.

Considering first an initial system which comprises only the computer vision, oculomotor, physics, facial animation render and screen modules. The additional portions of the model may be built from this base. Computer vision input, for example from a camera, is fed to a computer vision library which is used to detect the face. The computer vision input also demonstrates how 'black box' functionality or strictly computational elements can be integrated with a biologically based system. The detection of a face, or similar limitation or concentration of the input field (in this case visual) reduces the input data complexity for the model. This creates a target which is sent to the Superior Colliculus (SC) module which generates a saccade (fast eye movement) which generates activity in the motor neuron which creates an acceleration of the eye.

The physics system dampens the motion with inertial constraints, and the actual movement of the eye is fed back to the SC for correction. The physics module assists to reduce the possibility of unnatural movement, for instance by limiting the speed of the response, and to apply physical constraints. The computed movement of the eye is fed to the facial animation system which rotates the eye geometry accordingly and renders it on the screen. The eye movement can be fed back to the computer vision system to create a foveal area or line of sight; this allows the input to be related to an output of the model, creating a feedback loop or dependence in the model.

A more complex model may also include expression detection and expressive reaction. For instance the visual cortex, limbic system and Brainstem PG may be added into the model. The fusiform face area may be a convolutional neural network (CNN) for facial expression recognition which triggers different emotional behaviours (e.g. fear through the Platysma or smile through the Zygomatic Major). Central pattern generators (CPGs) may be used as a basis for the required actions in response to the emotions. The facial nucleus resolves facial muscle activity and sends animation weights to the facial animation system which deforms the geometry and this is fed to the face renderer and then the screen.

Neurotransmitters/neuromodulators may also be incorporated into the system through their relationship with the amygdala (AMG). The amygdala has connections (these may relate to biological projections in this case) to the autonomic and endocrine systems (e.g. through the Hypothalamus). Oxytocin (OXY), corticotrophin releasing hormone (CRH) and beta endorphin (BE) levels have mutual regulatory effects and are used in this example to modulate the triggering of brainstem facial circuits. The brainstem CPGs create patterns which control facial muscles over time. The dopamine producing ventral tegmental area (VTA) has anatomic connections from the SC and the AMG, and provides an example of interconnecting separate neural systems. The ability to connect modules separately from the configuration of the modules allows addition to and modification of the model in a straightforward manner.

Further inputs may be included to the system, for instance an audio processing system. This may detect speech. The incorporation of a new module may also require new modules in other module blocks, such as the cortex expanding to include a multimodal integration component to blend or combine the audial and visual inputs. However, the addition of a new module does not necessarily require the modification of previous connections, simplifying the expansion of the model. Further addition to the model may be achieved by the coordination of eye blinks between the oculomotor system and the facial nucleus. Eye blinks (which involve the palpebral part of the orbicularis oculi muscle (OOc)) are coordinated with saccades.

A blink neurons module is added to control the OOc muscle, and timing is coordinated through a connection with the oculomotor system. A second step may introduce a connection form the blink neurons to the dopamine system. Spontaneous eye blink rates (EBR) have been shown to be a clinical marker of dopaminergic functioning. A modulatory dopaminergic connection is made from the VTA to the blink neurons. The dotted connection indicates how dopamine can modulate the blink rate by adding new connections between separate systems. This modulates blink rate while still coordinating with saccadic activity, illustrating the flexibility of connecting different neural subsystems using the model. While the modules form a required structure comprising, for instance, a series of module groups or associated modules links can be made within or outside of these groups by connections. These connections allow the incorporation of high level effects or the coordination of effects across different module groups.

Further Structure

Referring again to FIG. 5 the system is shown having a hierarchical structure with modules often contained within other modules. In an embodiment of the system an individual module may be referenced by referring down the tree, from the top module to the base module. For instance, the FFA shader could be referenced as Head/brain/FFA/shader. Alternatively it may be preferable in some instances to have inputs and outputs tied to modules higher in the hierarchy, for instance a commonly used output such as face 56 may be assigned to the visual system module as an available output so as to make referencing the face easier.

Figure 7:
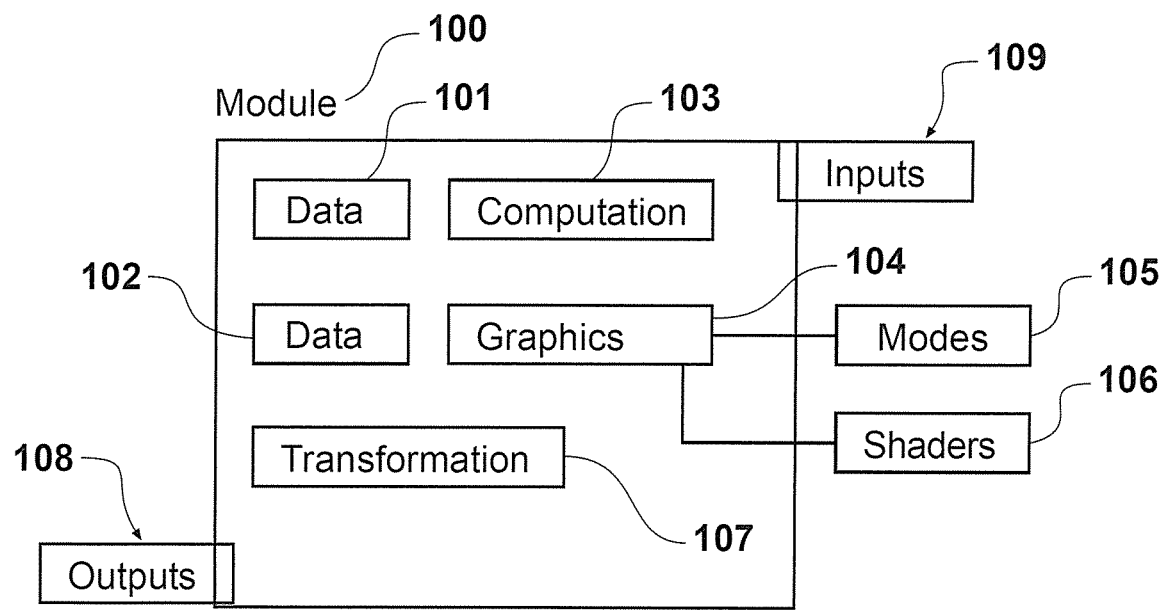
FIG. 7: Shows a schematic view of an embodiment of a module having a computational, graphical and transformation portion.

Referring now to FIG. 7 a representation of a module 100 is shown. The module 100 contains a data element 101 related to the computation 103, a data element 102 related to the graphics 104, an element related to the transformation of the module 107. Any dependent parts of the module may be contained in the module 100 but are preferably contained by way of a hierarchical tree structure in which the module is contained. A tree structure has a central point or module from which a plurality of modules branch from, with each lower layer of modules capable of having further child modules. In some cases a tree structure may have additional modules outside of the main branches. The inputs 109 and outputs 108 of the module 100 may be variables involved in any one or more of the elements or the module dependencies. The graphic element or data 102 this may contain a series of modes 105 associated with actions of the module and a series of shaders 106 which produce the appropriate levels of light in the image. Alternatively the module may provide a graphical output visualising a portion of the computation. The computation element may contain instructions, or a pointer to a computational block contained in a library structure or similar. In some case the computation element may be limited, the module acting as a constant or container module to improve the dependency structure of the hierarchy. In other embodiments the computation element may comprise a large and complex neural network or a single neuron.

The transformation element may provide data regulating how the module graphics can change as part of the animation, or how changes to dependent structures affect the graphic element. This is of particular importance when the hierarchical structure is used to traverse the model. Each module may have a transformation portion which provides instructions for how to react to changes in the modules above in the hierarchy. For example if the face changes direction the features of the face and the features contained in the brain should also rotate. The rotation of the face will affect the rotation of the eye, which may affect the appropriate rotation of the pupil. The hierarchical structure provides means for these changes to be consistent, so when drawing the element the changes of an element can be appropriately combined with the surrounding elements so as to create a realistic animation. Although the description of the transformation has been based on the hierarchical structure of the model it should be understood that an alternative structural method may be used which links the transformational means in a different way having as similar outcome.

Architecture

The system structure may comprise a first and a second model sub-structure (data structure) wherein the first sub-structure (level) is defined by the arrangement of a plurality of computational modules and the second sub-structure (level) is defined by the connectors linking the module variables. The first sub-structure may be a scene graph which is directed and graphical. This may allow the careful arrangement of the modules. The second sub-structure may be a directed graph in which the connections form edges and the modules form vertices or nodes. These two levels of sub-structure increase the effectiveness of operating the model because the data is separated from the controlling code. Therefore the modelling process becomes a method of linking the plurality of modules (this may be through the use of module variables) from the first sub-structure using the second sub-structure, rather than building a completely linked system or designing a process flow. The structure also allows for variables or constants to be updated while the model is operating. This is because the model does not need to be recompiled as the relationships or connections are separate from the data.

The first sub-structure may be implemented as a plurality of modules or a structure in which the plurality of modules are organised. The second sub-structure may be implemented as a set of instructions for combining modules. In some embodiments the set of instructions may be located in a plurality of separate files. The separate files may each define a portion or subsection of the connections of the model. In a particular embodiment the instructions may be located in the same structure as, but separate from, the modules.

First Sub-Structure (Modules)

Figure 3:
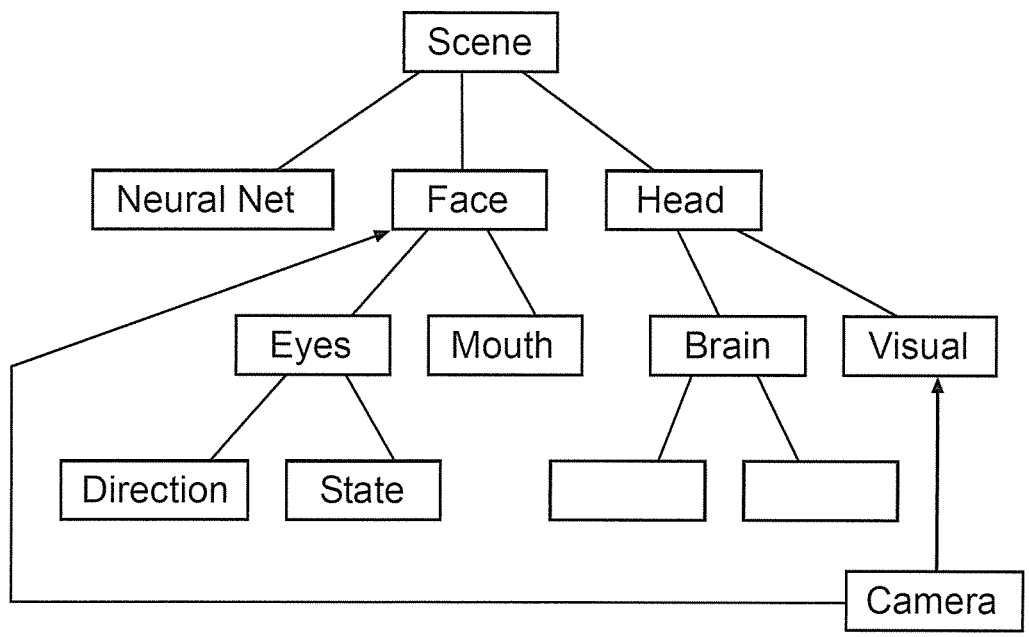
FIG. 3: Shows an embodiment of the invention where a plurality of modules are linked.

The first level may comprise an organised structure of the plurality of modules. In some embodiments this may be a tree-type structure in which the plurality of modules are organised substantially hierarchically. The plurality of modules may be arranged in a directory-like folder structure. This is particularly useful when container modules are present. FIG. 3 shows a possible structure in which a container module 'scene' holds a number of modules including a container module 'face'. The module 'face' holds two further modules 'eyes' and 'mouth'. This could be stored in a file like structure in which 'scene' was the top level folder, 'face' and 'head' were first level sub folders and 'eyes' and 'mouth' were sub-sub folders and so on. In this way the model structure is clear and easily viewable. Module elements may be copied or replicated by copying the required level of folder and all contained folders. This may be useful, for example, if each eye was to be independent. The same model structure would be replicated, however each eye could have different control signals or small changes could be made.

Second Sub-Structure (Connectors)

The substructure comprises a series of instructions relating to the modules. The instructions may be contained in a single file relating to the entire model or animation. In a preferred embodiment the second substructure comprises a series of separate, linked files. In an embodiment the instruction files are contained in the same structure as the modules. They are contained at a hierarchical level one (or more) above all of the models that depend on them in the required structure. For instance instructions linking the 'eyes' module may preferably be in the folder containing the 'face' module. However, the instructions could also be placed in a folder containing the 'scene' module or at any level above the 'face' module.

It is advantageous to place the instructions in the level directly above the module they refer to as this provides an efficient modelling technique. In particular, if changes need to be made to a certain module, or its instructions, the correct location can be found simply. Secondly the collocation of a module and related instructions allows the entire module to be quickly replicated with appropriate instructions. This may be useful so as to move the module to a different model or to copy the module internally within the model. In an embodiment there are separate instructions at each stage of the first substructure, so that:

instructions for 'direction' are in the eyes folder, instructions for 'eyes' are in the 'face' folder, and instructions for the 'face' are in the 'scene' folder.

Operation

When a model runs it compiles the first and second sub-structures (preferably arranged in a directory tree as described above) containing the configuration files to create its modules, connectors, geometry etc. A required structure may be in the form of a directory tree that may be varied in structure but is able to build the plurality of modules and the links between them. At each time step the structure must be traversed and updated. This may proceed either from a bottom up or top down approach, dependent on the particular design of the model as described above but is preferably top-down in a hierarchical structure with the head at the top. Each module is evaluated based on the inputs currently provided. This includes all container modules and their children. If a module has no code, such as a container module then no change will occur. If however, code or computational material is present this will be run, and is typically independent of any other part of the system. The results of the time step are then transmitted to the output fields. In a second pass through the structure the outputs may then be copied across the connections. This updates each of the modules inputs for the next time step. In some instances there may be processing which takes place on the connections, for instance holds or thresholds which may be updated in one or both of the stages. If substantial changes appear, or a set time period has passed the model may rebuild completely, including substantially all elements to ensure continuity.

Figure 4:
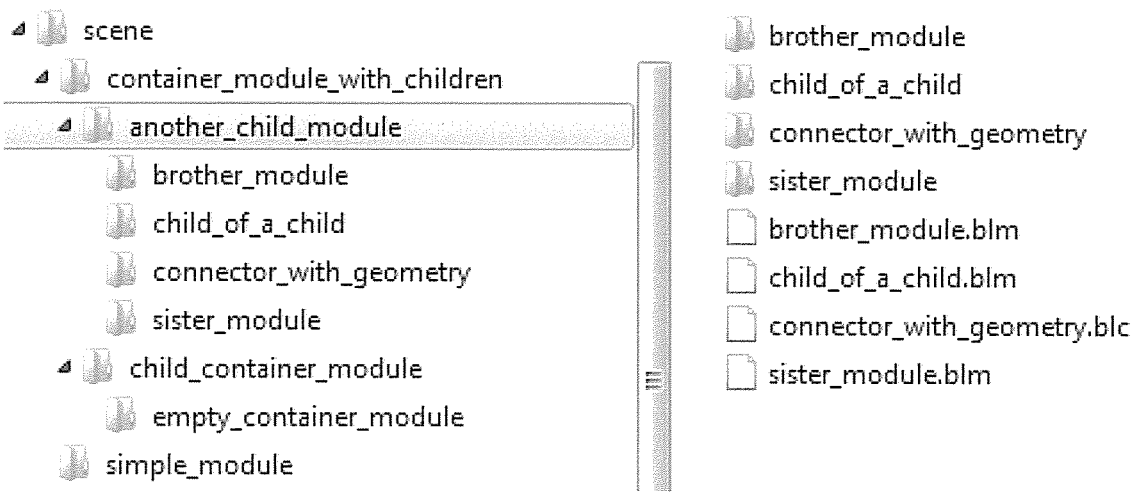
FIG. 4: Shows an embodiment of the invention where a plurality of modules are arranged in a folder structure.

In a particular example, as shown in FIG. 4, files or folders with equivalent names (not including any file extension) are assumed to contain data belonging to the same object. For instance, geometry data (.obj, .frag, .vert, .geom, .mtl, .tex, .trans, or image files) must have an equivalent name to the object it belongs to and should be placed inside a folder of an equivalent name. Object definition files, or instruction files (.blm, .blc) may be placed in the same parent directory as this folder. A simple module with geometry, shaders but no textures could be specified as shown in FIG. 4. Therefore when the code is operating it may read and connect items with common names and these provide the additional details to the model.

Modules

If a new module is required this can be prepared separately of the modelling system. Modules may vary depending on the embodiment and particular model but may include:

Animation;
provide a known time step,
includes an animation file,
Folder modules;
also known as a container modules,
Hold other modules,
Neuron module;
E.g. leaky integrate and fire module,
Multiple leaky integrate neurons,
Synapse weights module;
May be combined with neurons module to form self-contained artificial neural network,
Visual interface modules;
Scrolling display module to illustrate outputs,
Interface modules;
Vision module,
May control interactions with outside world e.g. camera or microphone,
A constant value;
no dependence on time-stepping,
Black box;
Stand-in module to perform task or to be updated later,
Nothing;
Empty modules may be ignored.

Further modules or types of module may be created as required.

Module Descriptions

Before a module can be used in the modelling environment it must first be created. This involves defining the inputs and outputs of the model and the relations between them. The module definitions are then placed.

For instance, considering a well-known model of a neuron, such as the leaky integrate and fire neuron, this may be described mathematically by:

$$I(t) - \frac{V_m(t) - V_{m_{tonic}}}{R_m} = C_m \frac{dV_m(t)}{dt}$$

Which is conveniently rewritten as:

$$\frac{dV_m(t)}{dt} = FC_i \cdot V_i(t) - FC_m(V_m(t) - V_{m_{tonic}})$$

The module definition lists the variables and describes the action of the module when used. The variables are important because they allow connections or links to be made between modules. Variables are how a module's parameters can be accessed in order to make links or connections. Some variables may refer to multiple values while some may refer to only a single value. Some variables are designated as output variables. These variables are the output of a module's computational processes and are defined so as they may not be modified externally, being effectively "read-only" variables. Other variables are designated as input variables. These variables affect the module's computation of its outputs, but are not themselves changed by the module. They are "read-write" variables able to be modified externally or simply read. Occasionally a variable may be designated both input and output. This means that it may be externally modified, but that its value may also be modified as a result of the module's computation.

Every module type except for container modules may require a file to set its type and its parameters. The first line of this file typically identifies the type of module it's creating. The following lines contain settings relevant to the type specified on the first line. In a particular model or animation the module file (for instance .blm) may create an object based on one of the defined modules such as the leaky integrate and fire neuron. A module is inserted into the model by defining the required inputs and outputs. An example code for the module is shown in code section A. Ignoring the formatting, this example module first names the module type and then lists each input followed by a default value. If an input is not declared when inserting a module the default value may be used. In this way the neuron model must only be created once and then may be inserted into the animation or model at multiple points through creation of an appropriate .blm file.

| Code Section A |
| --- |
| BL_leaky_integrate_and_fire_module |
| number_of_inputs=<number_of_inputs> |
| [voltage=<starting voltage>[=0.]] |
| [fired=<starting_fired_value>[=0.]] |
| [fired_value=<fired_value>[=0.]] |
| [firing_threshold_voltage=<threshold_voltage>[=0.]] |
| input_frequency_constants=<input_frequency_constants>[=0.] |
| [input_voltages=<input_voltages>[=0.]] |
| [maximum_voltage=<maximum_voltages>[=0.]] |
| [membrane_frequency_constant=membrane_frequency_constant>[=0.]] |
| [minimum_voltage=<minimum_voltage>[=1.]] |
| [reset_voltage=<reset_voltage>[=0.]] |
| [tonic_voltage=<tonic_voltage>[=0.]] |
| [use_firing=<use_firing>[=0]] |
| [time_step=<time_step>[=0. 001]] |

Variables and Connections

Variables and connectors provide links between the plurality of modules of the first sub-structure. Variables provide means for a module's parameters to be accessed by connectors. Some variables may refer to multiple values while some may refer to only a single value. Variables may be defined as internally or externally available and editable if required. Modules may have several variables, which may be either input or output (sometimes both). Output variables are determined by the computational processes of their owner module and may be read, but not modified, by connectors. Input variables are input parameters to the module's computation and may be both read and written by connectors. When referring to a variable (or any module or connector for that matter), the syntax reflects the hierarchical, directory-based structure of the data.

The variables may be created as part of the module building definition process. Variables can be linked together by instructions to create the model or animation. Instructions link one, or a plurality of variables, so that in a time step variables may be passed between modules. In some embodiments variables may also have holds, pauses or other processing when being passed between modules or the timing may be otherwise adjusted. In some embodiments variables may have sub-variable members. This provides a means to refer to a group of variables or a member of the group. For instance, a file named texture data may have three sub-variables:

texture.data—referring to the texture's colour data array;
texture.width—referring to the texture's width (in texels); and
texture.height—referring to the texture's height (in texels).

To refer to a module, the directory path to the module, beginning at the directory in which the reference is made may be used. For example if the module "test_module" is located in the same directory as a connector, the module is simply called "test_module". However, if test_module is a child of a module called "parent_module" and connector is in the same directory as parent_module, then "parent_module/test_module" is used. Variables may be considered as children of their parent modules and are referred to using the same hierarchical syntax. If test_module has a variable called "output", this variable is referred to as "test_module/output". The same rules about directory paths described above may be applied. To refer to the variable output when in the parent_module directory (see previous paragraph), it is necessary to use the path "parent_module/test_module/output". It may be observed that instructions contained in files near to their associated modules provide simple names in such an embodiment.

Connectors

The second sub-structure links or connects modules together. Connectors link variables of modules to one another. Files which define connectors may include an identifier declaring the type of connector to create, preferably on the first line. The connector files also contain type-specific information, although generally there will be at least one line in which the input variables are transmitted to a, or a plurality of, other variable.

Possible connector types include, but are not limited to
 Identity Connectors
  Strict equalities
  Simple and common

---

BL_identity_connector
simple_module/input_variables[0]=another_module/output_variables[2]
another_module/special_variable=a_third_module/output_variables[0]

---

Linear Transform Connector
 Transforms variable when transmitting
 Threshold based relationships
 Combinations of variables
 Comparisons of variables
Damped sum connectors
 a system of linear transformation connectors and neurons such as leaky-integrate-and-fire (LIF). Connects linear combinations of inputs to output variables but "damps" the sum of these inputs by passing them through a LIF neuron first.

Where in the foregoing description, reference has been made to specific components or integers of the invention having known equivalents then such equivalents are herein incorporated as if individually set forth.

Unless the context clearly requires otherwise, throughout the description and the claims, the words "comprise", "comprising", and the like, are to be construed in an inclusive sense as opposed to an exclusive or exhaustive sense, that is to say, in the sense of "including but not limited to".

Although this invention has been described by way of example and with reference to possible embodiments thereof, it is to be understood that modifications or improvements may be made thereto without departing from the scope or spirit of the invention as defined in the appended claims.

What we claim is:

1. A computer implemented system for generating interactive behavior of an embodied virtual character or digital entity, the system comprising:
 a plurality of interconnected modules together representative of a neurobehavioral model,
 at least one of the plurality of interconnected modules receiving data characterizing a real-world input stimulus;
 wherein the neurobehavioral model is time-stepped such that the plurality of interconnected modules operate in a time-step to provide an external output defining a response of the virtual character or digital entity to the external stimulus and wherein time-stepping within modules occurs at a rate providing multiple computational time-steps before a response is provided.

2. The system of claim 1, including an external output defining an audible response of the virtual character or digital entity to the external stimulus.

3. The system of claim 1, including an external output defining a physical response of the virtual character or digital entity to the external stimulus and wherein the physical response is any of: change of orientation, a change of emotional expression, a change in body language, or mirroring the external input.

4. The system of claim 1, wherein each module has at least one variable and is associated with at least one connector, wherein the connectors communicate information on variable values between modules in a time-stepped manner.

5. A computer implemented system for generating interactive behavior of an embodied virtual character or digital entity, the system comprising:
 a plurality of interconnected modules together representative of a neurobehavioral model,
 at least one of the plurality of interconnected modules receiving data characterizing a real-world input stimulus;
 wherein the neurobehavioral model is time-stepped such that the plurality of interconnected modules operate in a time-step to provide an external output defining a response of the virtual character or digital entity to the external stimulus and wherein the plurality of the modules have coupled computational and graphical elements, each module representing a biological process and having a computational element relating to and simulating the biological process and a graphical element visualizing the biological process.

6. A computer implemented system for generating interactive behavior of an embodied virtual character or digital entity, the system comprising:
 a plurality of interconnected modules together representative of a neurobehavioral model,
 at least one of the plurality of interconnected modules receiving data characterizing a real-world input stimulus;
 wherein the neurobehavioral model is time-stepped such that the plurality of interconnected modules operate in a time-step to provide an external output defining a response of the virtual character or digital entity to the external stimulus and wherein the plurality of interconnected modules together representative of a neurobehavioral model simulate multiple parallel systems for generating behavior, and at least one module is configured to resolve competing inputs from a plurality of other inputs from the interconnected module to provide the external output defining a response of the virtual character or digital entity to the external stimulus.

7. A facial graphics rendering system, comprising: a plurality of layers, the plurality of layers comprising:
 a graphics rendering layer which receives muscle actuation/position data defining degrees of actuation of a set of facial animation muscles and which generates graphics image data;

a muscle actuation/integration layer receiving nerve actuation data defining a degrees of nerve activation for a set of animation nerves and generating muscle actuation data for a set of activation muscles defined for the muscle actuation layer; and a nerve activation layer receiving expression data defining an expression and generating nerve activation data defining a combination of animation nerves to be activated and defining a degree of activation for each nerve.

8. The system of claim 7, wherein each of the plurality of layers receives stimulus data and generates feedback data.

9. The system of claim 5, wherein at least one of the plurality of interconnected modules receives data characterizing an internal stimulus from another one of the plurality of interconnected modules, wherein the internal stimulus also affects the external output defining the response of the virtual character or digital entity to the external stimulus.

10. The system of claim 5, wherein the real-world stimulus is received from one or more of the group consisting of a camera, an electromagnetic transducer, an audio transducer, a keyboard, and a graphical user interface.

11. The system of claim 5, wherein the interconnected modules are configured to exhibit chaotic behavior, depending in a nonlinear way on a past state as characterized by module variable values.

12. The system of claim 5, wherein the output is at least one of: graphical output or actuation of a physical robot.

13. The system of claim 5, wherein at least one of the plurality of interconnected modules creates an association between the external stimulus and the external output.

14. The system of claim 5, including an external output defining an audible response of the virtual character or digital entity to the external stimulus.

15. The system of claim 5, including an external output defining a physical response of the virtual character or digital entity to the external stimulus and wherein the physical response is any of: change of orientation, a change of emotional expression, a change in body language, or mirroring the external input.

16. The system of claim 5, wherein the external stimulus affects the operation of the neurobehavioral model over time.

17. The system of claim 5, wherein each module has at least one variable and is associated with at least one connector, wherein the connectors communicate information on variable values between modules in a time-stepped manner.

18. The system of claim 6, wherein at least one of the plurality of interconnected modules receives data characterizing an internal stimulus from another one of the plurality of interconnected modules, wherein the internal stimulus also affects the external output defining the response of the virtual character or digital entity to the external stimulus.

19. The system of claim 6, wherein the real-world stimulus is received from one or more of the group consisting of a camera, an electromagnetic transducer, an audio transducer, a keyboard, and a graphical user interface.

20. The system of claim 6, wherein the interconnected modules are configured to exhibit chaotic behavior, depending in a nonlinear way on a past state as characterized by module variable values.

21. The system of claim 6, wherein the output is at least one of: graphical output or actuation of a physical robot.

22. The system of claim 6, wherein at least one of the plurality of interconnected modules creates an association between the external stimulus and the external output.

23. The system of claim 6, including an external output defining an audible response of the virtual character or digital entity to the external stimulus.

24. The system of claim 6, including an external output defining an physical response of the virtual character or digital entity to the external stimulus and wherein the physical response is any of: change of orientation, a change of emotional expression, a change in body language, or mirroring the external input.

25. The system of claim 6, wherein the external stimulus affects the operation of the neurobehavioral model over time.

26. The system of claim 6, wherein each module has at least one variable and is associated with at least one connector, wherein the connectors communicate information on variable values between modules in a time-stepped manner.

* * * * *

UNITED STATES PATENT AND TRADEMARK OFFICE
CERTIFICATE OF CORRECTION

| | | |
|---|---|---|
| PATENT NO. | : 10,755,465 B2 | |
| APPLICATION NO. | : 16/204645 | |
| DATED | : August 25, 2020 | |
| INVENTOR(S) | : David Peter Bullivant et al. | |

It is certified that error appears in the above-identified patent and that said Letters Patent is hereby corrected as shown below:

On the Title Page

Column 1, the following information should be added:
-- (30) Foreign Application Priority Data
Aug. 2, 2013 (NZ) ...............................613938 --

Signed and Sealed this
Twenty-fifth Day of April, 2023

Katherine Kelly Vidal
*Director of the United States Patent and Trademark Office*